United States Patent
Kim et al.

(10) Patent No.: US 12,171,034 B2
(45) Date of Patent: Dec. 17, 2024

(54) TECHNIQUE FOR SUPPORTING DUAL CONNECTIVITY IN WLAN SYSTEM

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 631 days.

(21) Appl. No.: 17/310,166

(22) PCT Filed: Jan. 23, 2020

(86) PCT No.: PCT/KR2020/001189
§ 371 (c)(1),
(2) Date: Jul. 22, 2021

(87) PCT Pub. No.: WO2020/159164
PCT Pub. Date: Aug. 6, 2020

(65) Prior Publication Data
US 2022/0124852 A1   Apr. 21, 2022

Related U.S. Application Data

(60) Provisional application No. 62/797,375, filed on Jan. 28, 2019.

(51) Int. Cl.
*H04W 84/04* (2009.01)
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
None
See application file for complete search history.

(56) References Cited

U.S. PATENT DOCUMENTS

2005/0141468 A1\* 6/2005 Kim .................. H04W 76/10
                                                              370/338
2017/0048048 A1   2/2017 Seok
(Continued)

FOREIGN PATENT DOCUMENTS

KR      20050065123      6/2005
KR       100900934       6/2009
(Continued)

OTHER PUBLICATIONS

PCT International Application No. PCT/KR2020/001189, International Search Report dated Apr. 27, 2020, 4 pages.

*Primary Examiner* — Willie J Daniel, Jr.
(74) *Attorney, Agent, or Firm* — LEE, HONG, DEGERMAN, KANG & WAIMEY

(57) ABSTRACT

According to one embodiment of the present specification, an STA may be connected to a primary AP and a secondary AP simultaneously. The STA may acquire control information related to whether the secondary AP can acquire a transmission/reception signal of the primary AP. Thereafter, the STA may transmit a UL signal to the primary AP. The STA may transmit, on the basis of whether the secondary AP can acquire the transmission/reception signal of the primary AP, a block acknowledgement request (BAR) signal for a UL signal to the secondary AP.

8 Claims, 28 Drawing Sheets

(56) References Cited

U.S. PATENT DOCUMENTS

2017/0055300 A1\* 2/2017 Pitchaiah .............. H04W 76/11
2017/0149547 A1\* 5/2017 Kim ..................... H04L 1/1685

FOREIGN PATENT DOCUMENTS

WO 2016039526 3/2016
WO 2017030723 2/2017

\* cited by examiner (a)

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

TECHNIQUE FOR SUPPORTING DUAL CONNECTIVITY IN WLAN SYSTEM

CROSS-REFERENCE TO RELATED APPLICATIONS

This application is the National Stage filing under 35 U.S.C. 371 of International Application No. PCT/KR2020/001189, filed on Jan. 23, 2020, which claims the benefit of U.S. Provisional Application No. 62/797,375, filed on Jan. 28, 2019, the contents of which is hereby incorporated by reference herein in its entirety.

BACKGROUND

Field of the Disclosure

The present specification relates to a wireless communication, and more particularly, to a method for supporting a dual connectivity in a wireless LAN system and a wireless terminal using the same.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARD) scheme, or the like, which is newly proposed. The EHT standard may be called the IEEE 802.11be standard.

Since the STA can connect to only one AP in the conventional wireless LAN system, the conventional STA has to wait for a certain time period or perform a connection to another AP when a communication with the AP is not smooth or difficult.

SUMMARY

The newly proposed wireless LAN system may support a dual connectivity. The STA may establish a connection with the first AP and the second AP at the same time. However, when the STA transmits a signal to the first AP but the first AP does not receive the signal, the second AP may need to transmit a response signal to the STA instead. Accordingly, a method for transmitting a response signal from the second AP to the STA may be proposed.

An example in accordance with the present specification relates to a method and/or apparatus for supporting a dual connectivity in a wireless communication system.

The STA according to an example of the present specification may obtain/acquire control information related to whether a second Access Point (AP) can acquire the transmission/reception signal of a first AP.

The STA according to an example of the present specification may transmit an Uplink (UL) signal to the first AP.

The STA according to an example of the present specification may determine whether to transmit a block acknowledgment request (BAR) signal for the UL signal to the second AP based on the control information.

According to an embodiment of the present specification, a scheme in which an STA supporting a dual connectivity in a wireless LAN system can communicate with a second AP even when a connection state to the first AP is not good may be proposed.

In addition, according to an embodiment of the present specification, the second AP may respond to an uplink (UL) signal transmitted by the STA instead of the first AP. Therefore, the STA does not need to retransmit the UL signal to receive the response signal. According to the exemplary embodiment of the present specification, the overall performance of the wireless LAN system may be improved.

BRIEF DESCRIPTION OF THE DRAWINGS

FIG. 18 illustrates an example of a PPDU used in the present specification.

DESCRIPTION OF EXEMPLARY EMBODIMENTS

Figure 1:
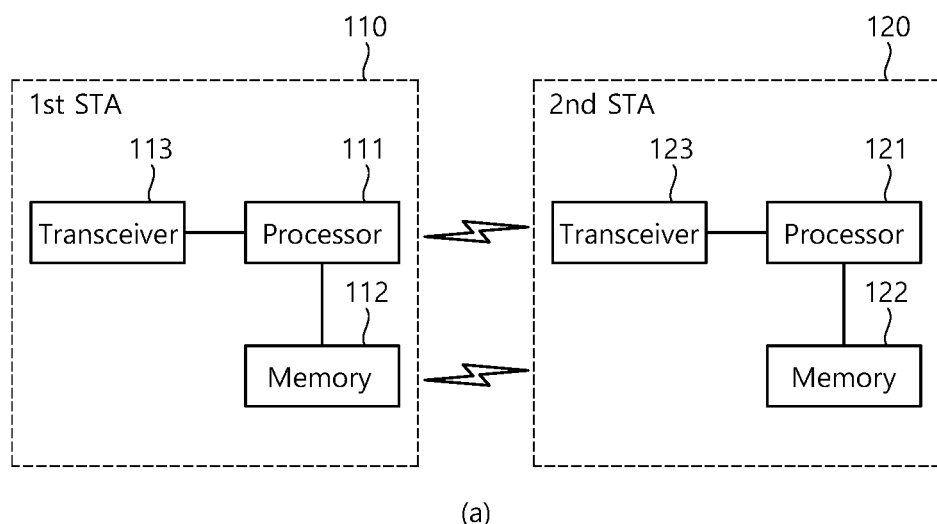
FIG. 1 shows an example of a transmitting apparatus and/or receiving apparatus of the present specification.
Figure 1:
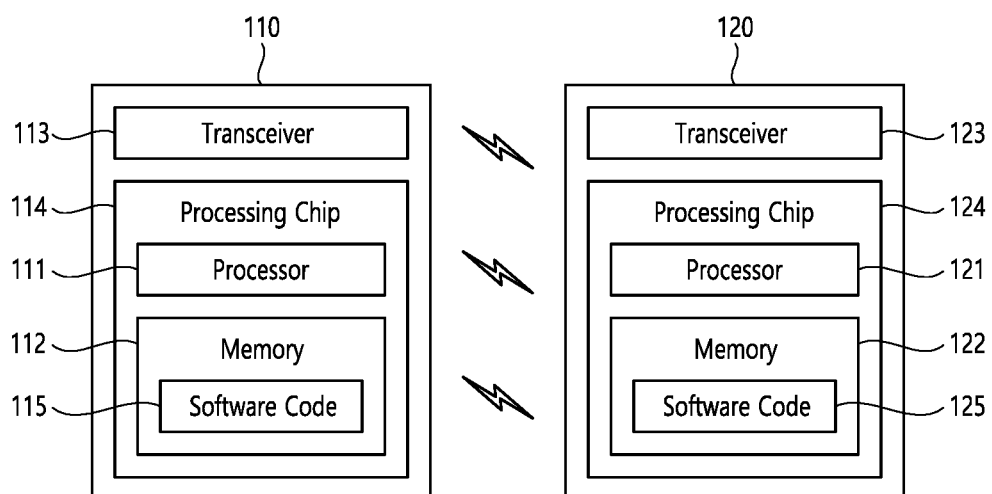

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

In The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
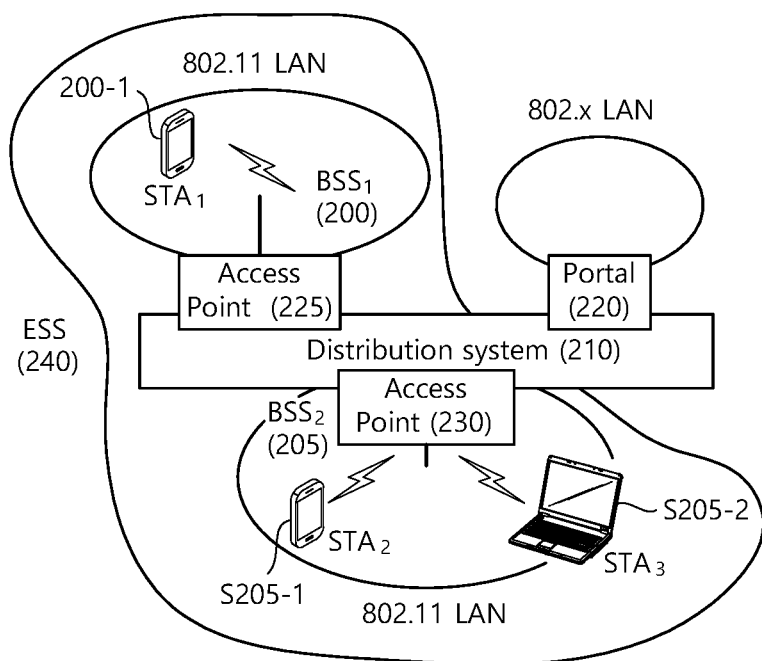
FIG. 2 is a conceptual view illustrating the structure of a wireless local area network (WLAN).
Figure 2:
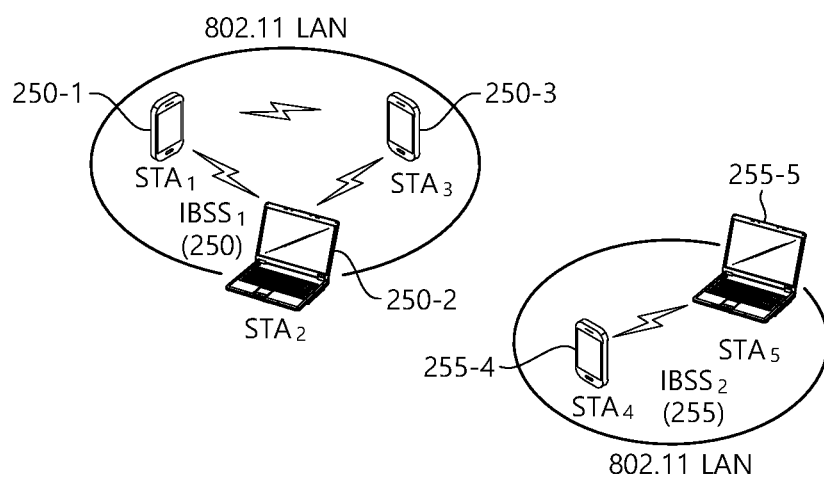

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
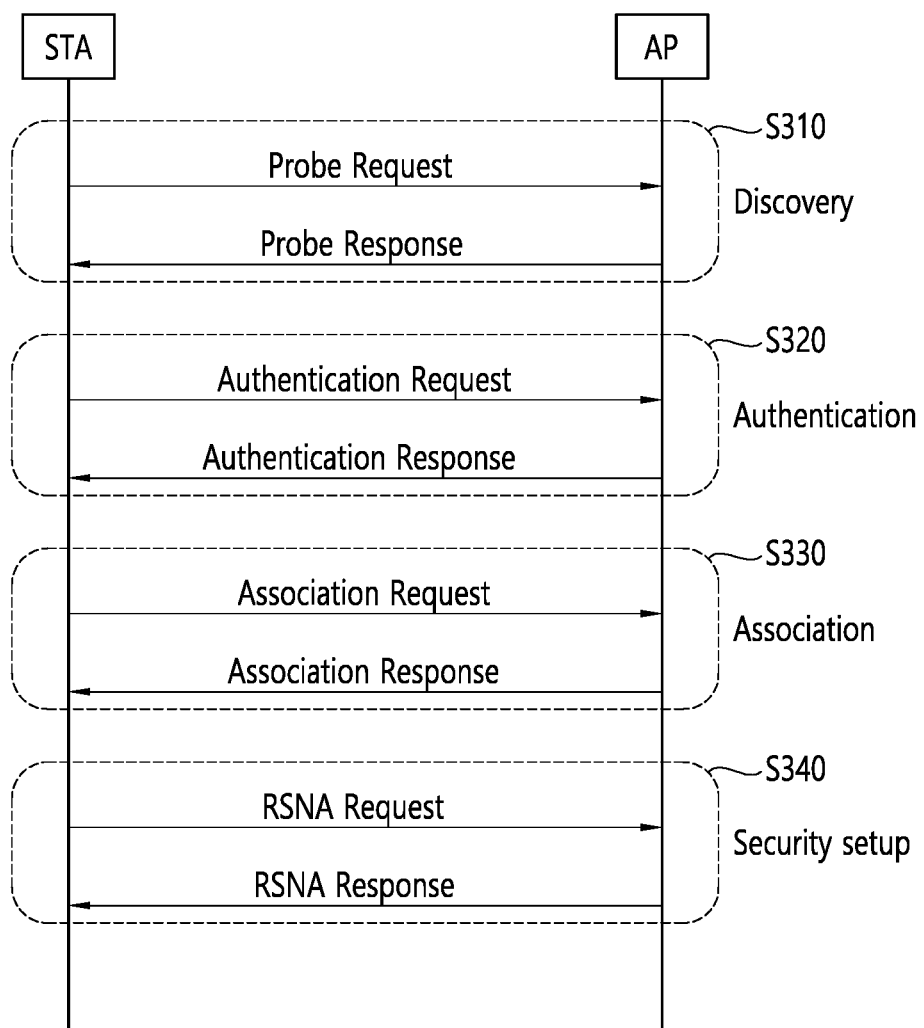
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
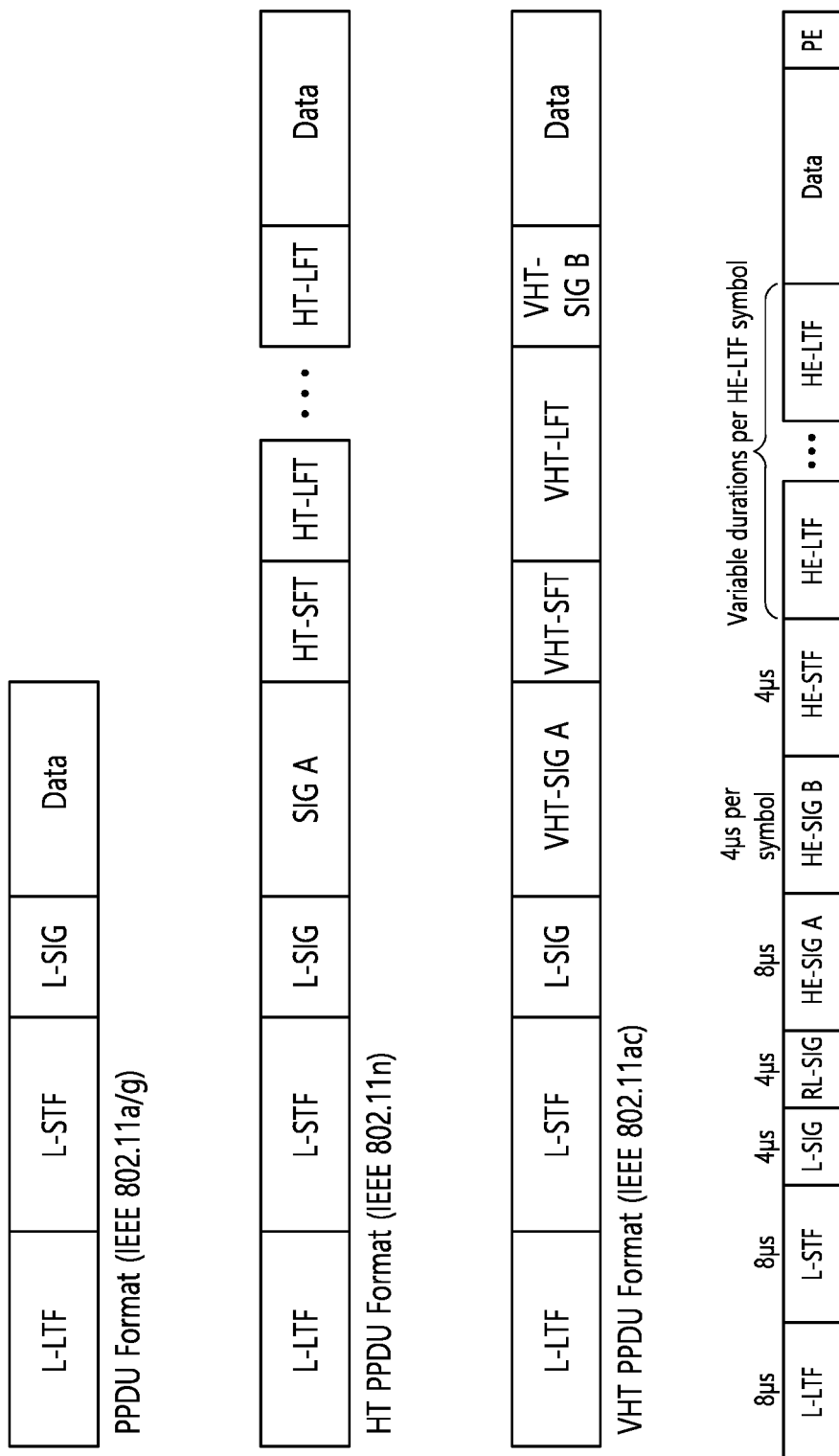
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
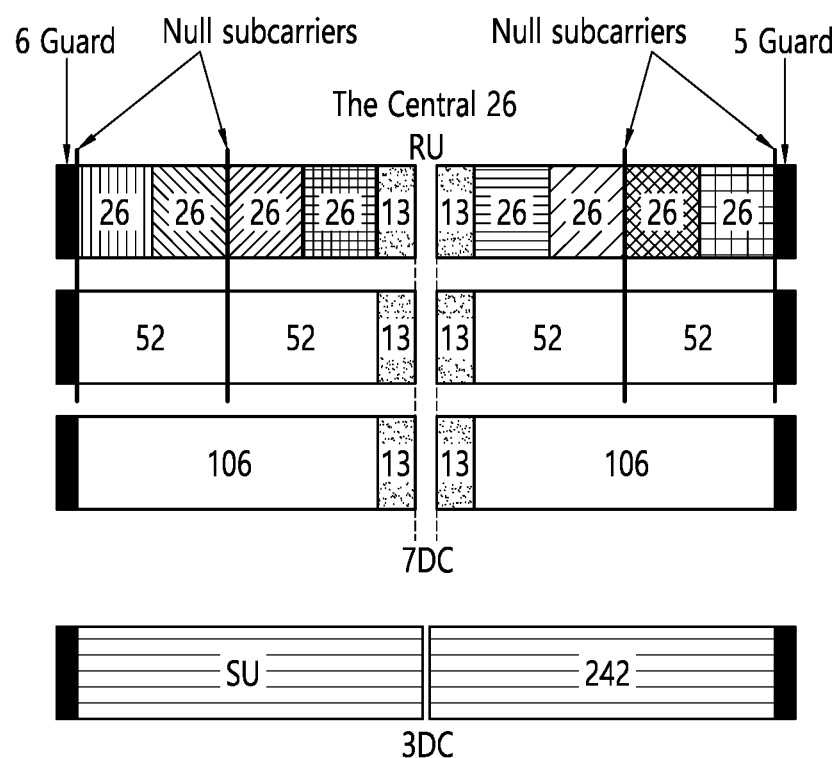
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
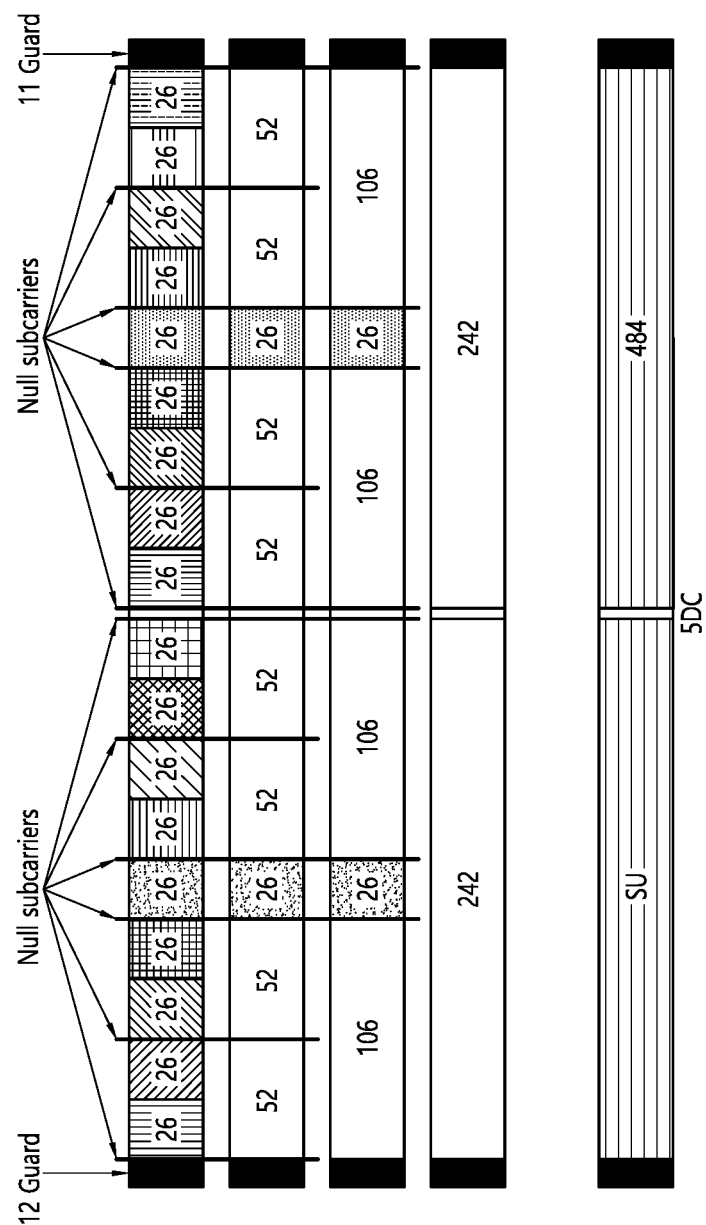
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
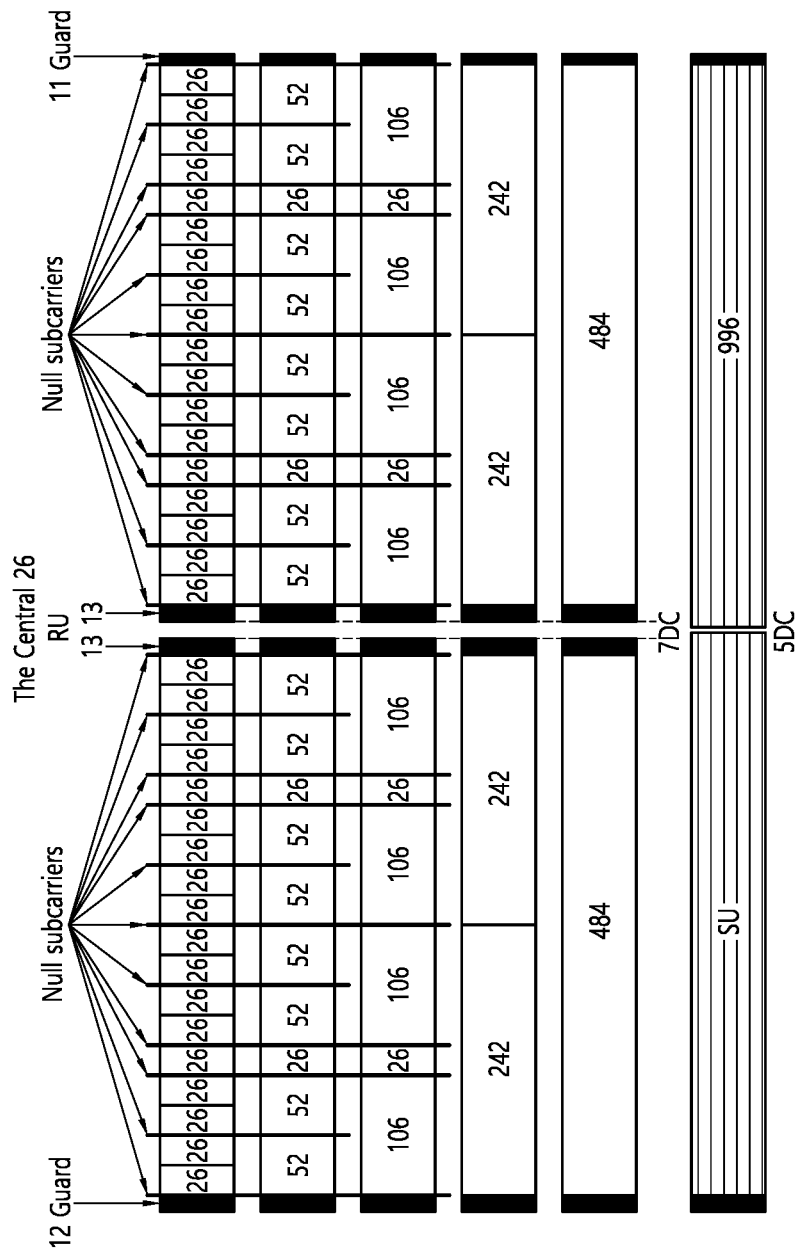
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
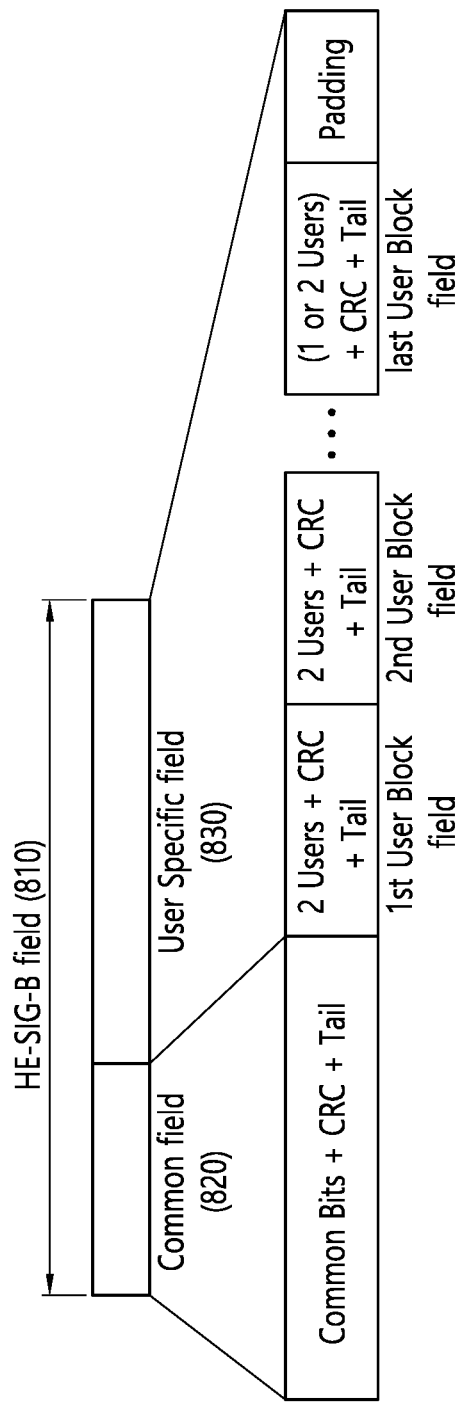
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2 y_1 y_0$ | | | 106 | | 26 | 26 | 26 | 26 | 26 | 8 |
| 01001$y_2 y_1 y_0$ | | | 106 | | 26 | 26 | 26 | 52 | | 8 |

"01000$y_2 y_1 y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2 y_1 y_0$). For example, when the 3-bit information ($y_2 y_1 y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
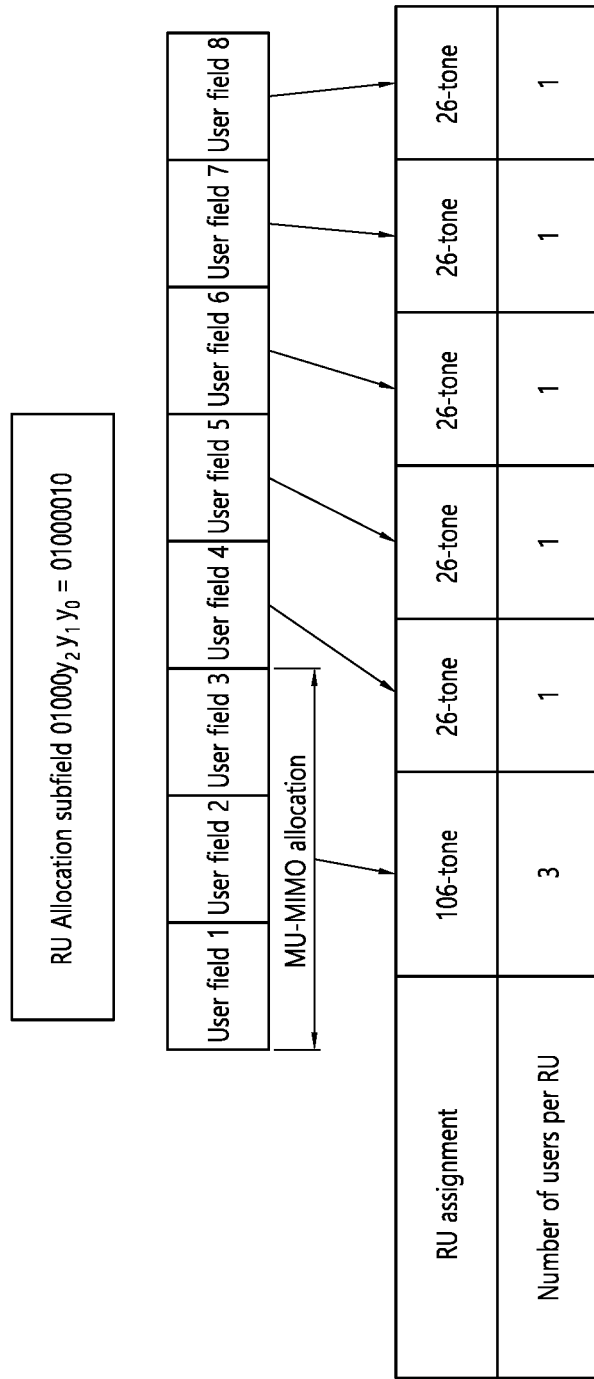
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 |   |
|   | 0111-1000 | 3-4 | 3 | | | | | | | 6-7 |   |
|   | 1001 | 4 | 4 | | | | | | | 8 |   |
| 3 | 0000-0011 | 1-4 | 1 | 1 | | | | | | 3-6 | 13 |
|   | 0100-0110 | 2-4 | 2 | 1 | | | | | | 5-7 |   |
|   | 0111-1000 | 3-4 | 3 | 1 | | | | | | 7-8 |   |
|   | 1001-1011 | 2-4 | 2 | 2 | | | | | | 6-8 |   |
|   | 1100 | 3 | 3 | 2 | | | | | | 8 |   |
| 4 | 0000-0011 | 1-4 | 1 | 1 | 1 | | | | | 4-7 | 11 |
|   | 0100-0110 | 2-4 | 2 | 1 | 1 | | | | | 6-8 |   |
|   | 0111 | 3 | 3 | 1 | 1 | | | | | 8 |   |
|   | 1000-1001 | 2-3 | 2 | 2 | 1 | | | | | 7-8 |   |
|   | 1010 | 2 | 2 | 2 | 2 | | | | | 8 |   |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 |   |
|   | 0110 | 2 | 2 | 2 | 1 | 1 | | | | 8 |   |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 |   |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a values of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
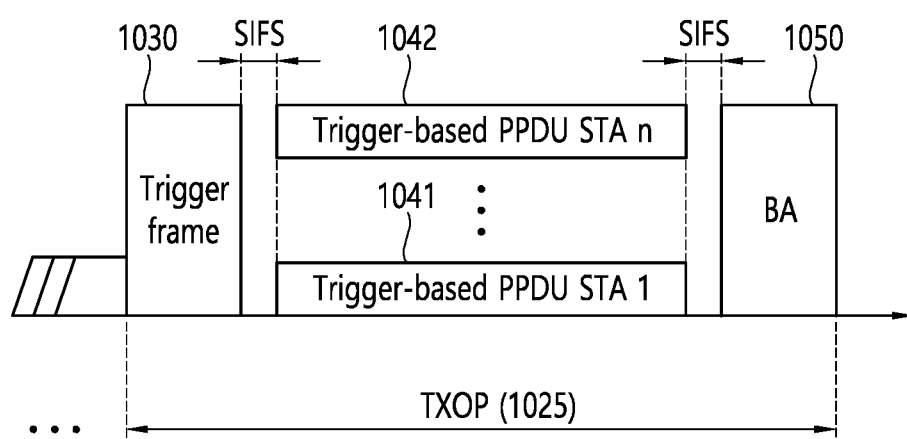
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
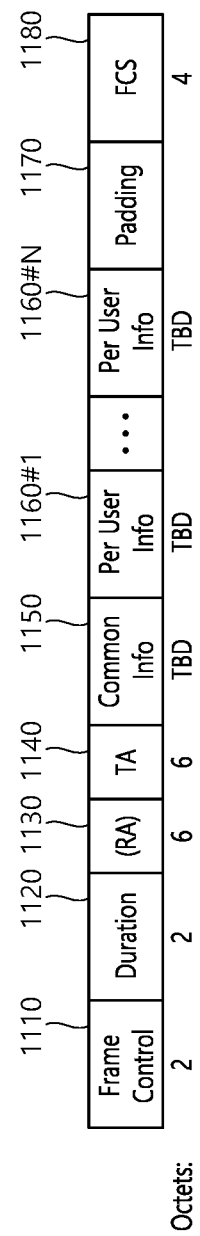
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
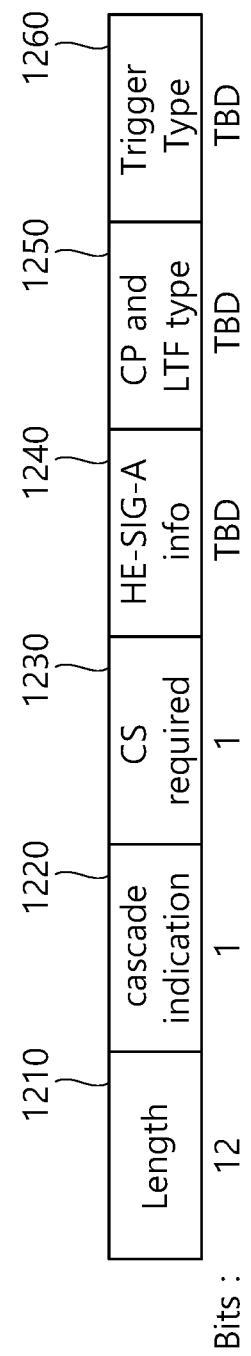
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
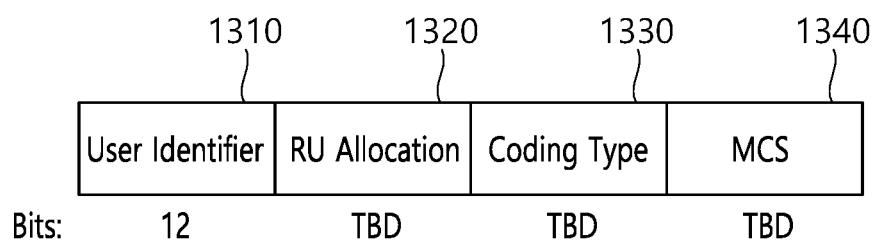
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
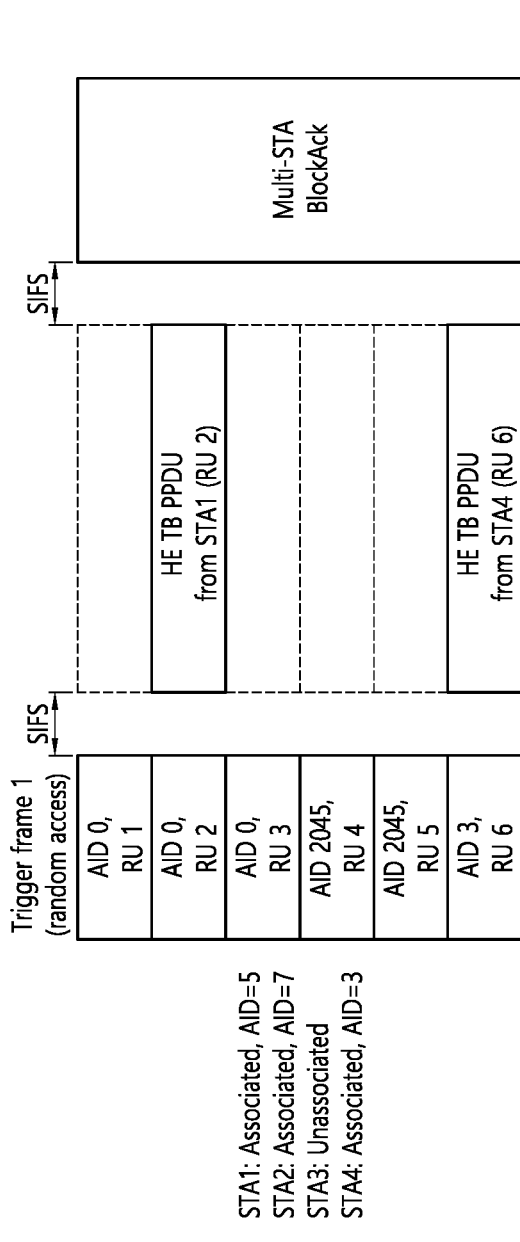
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
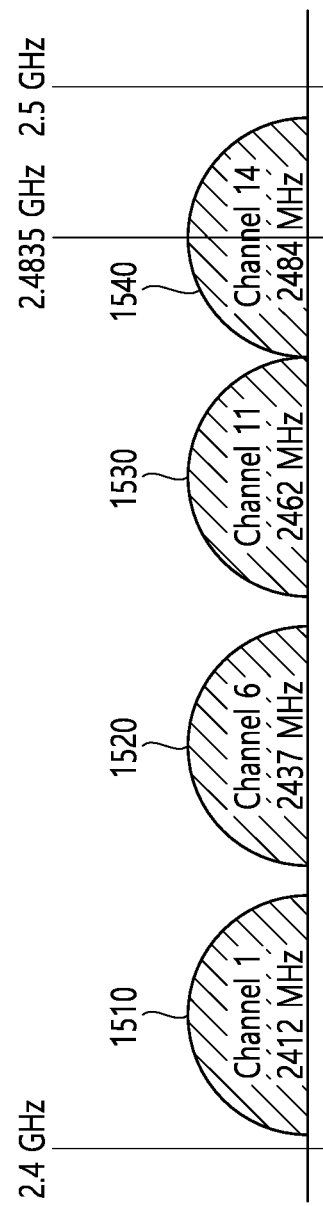
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
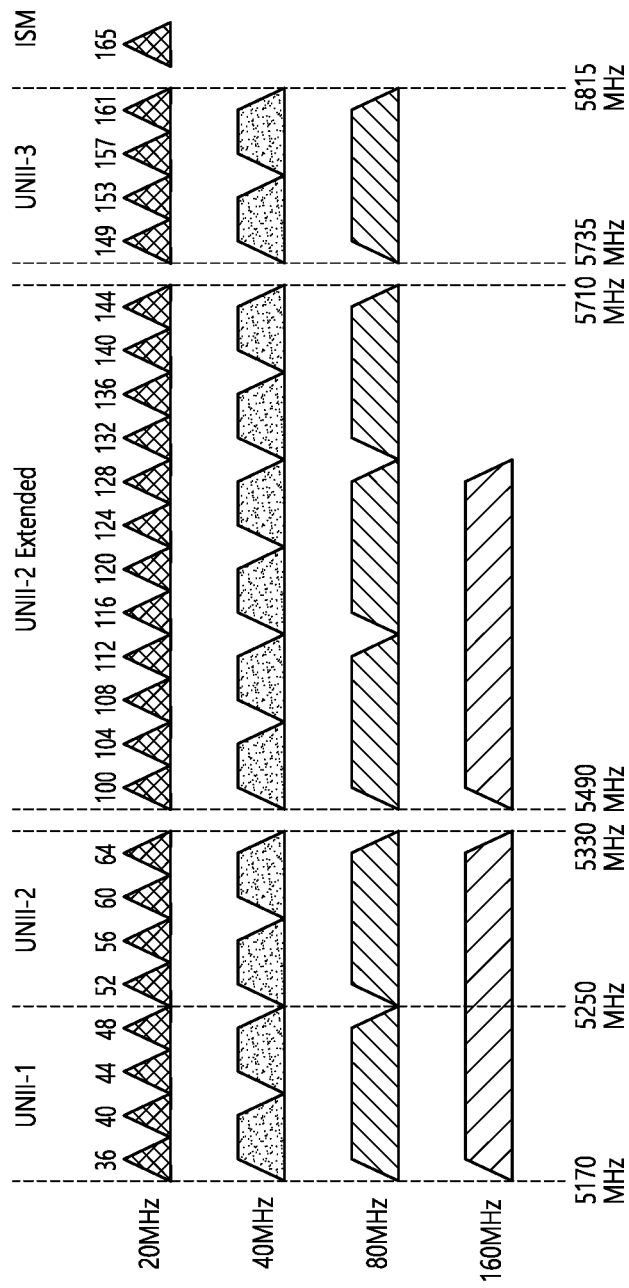
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
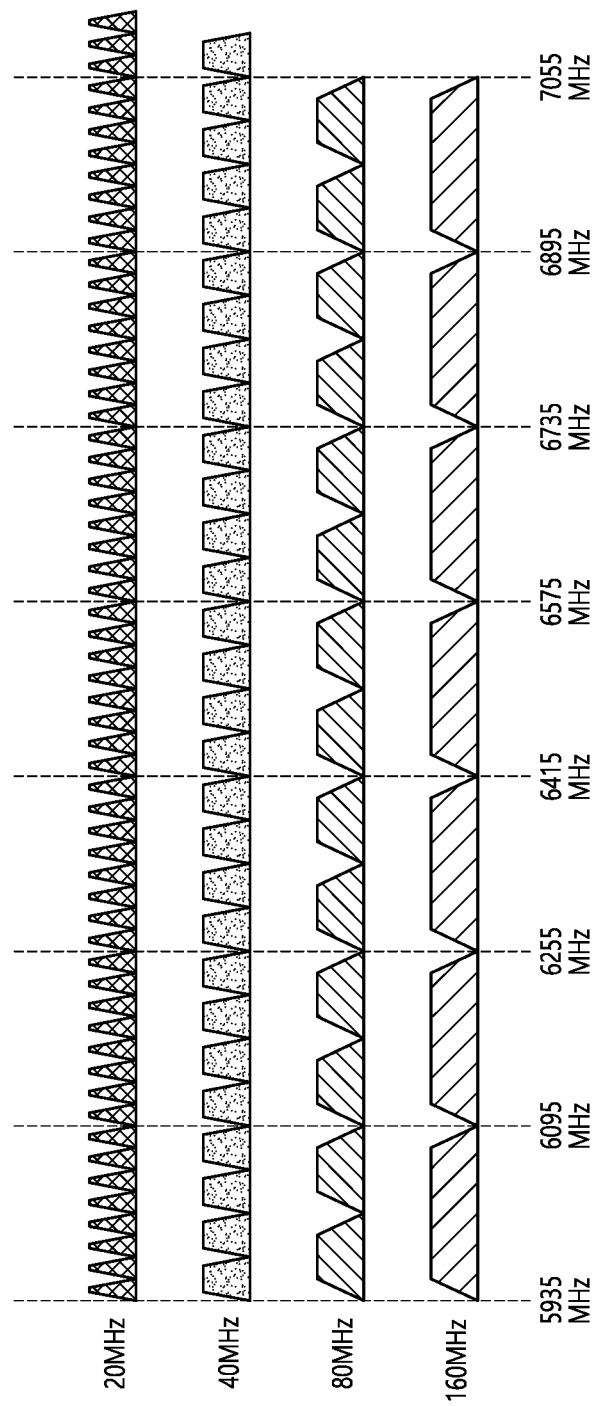
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., lx STF) may be generated based on a first type STF sequence in which a non-zero coefficient is arranged with an interval of 16 subcarriers. An STF signal generated based on the first type STF sequence may have a period of 0.8p, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
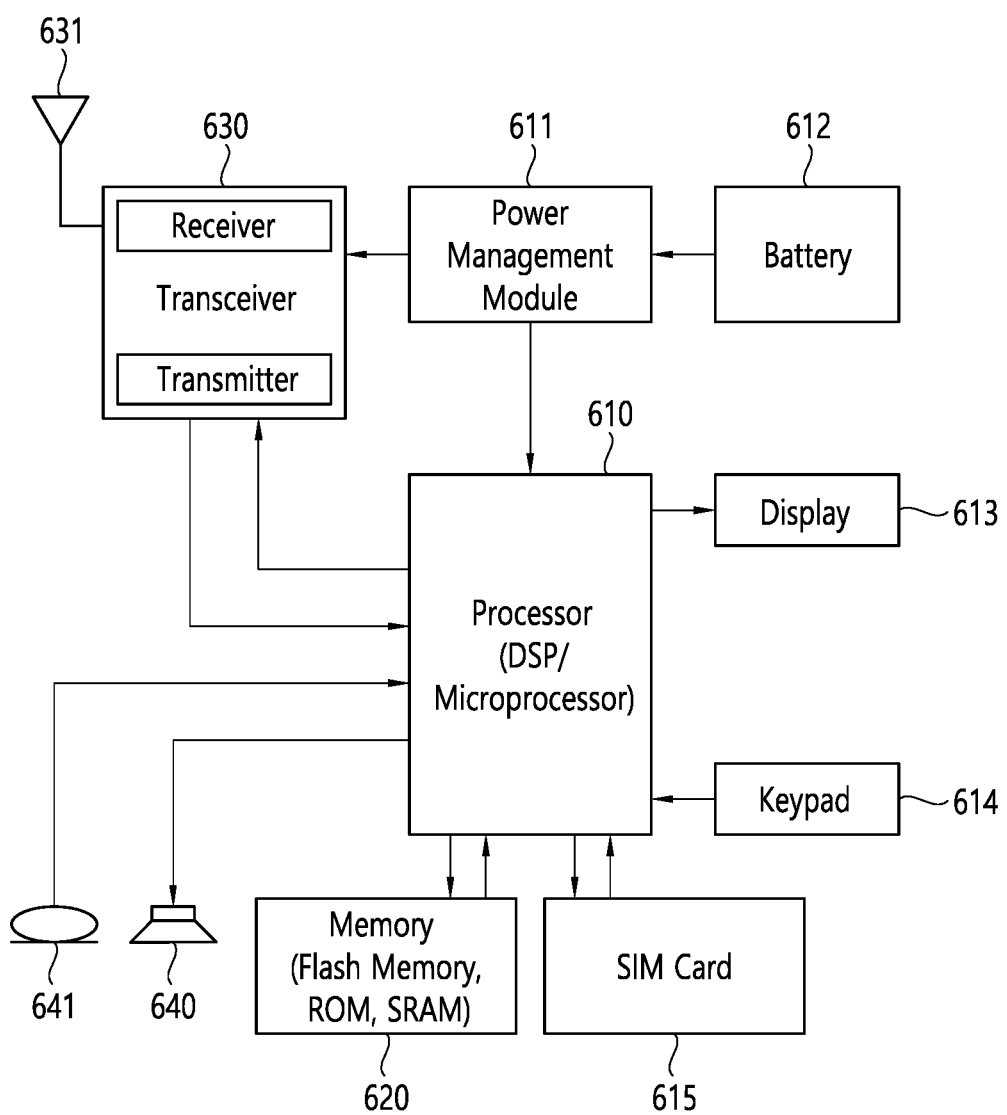
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
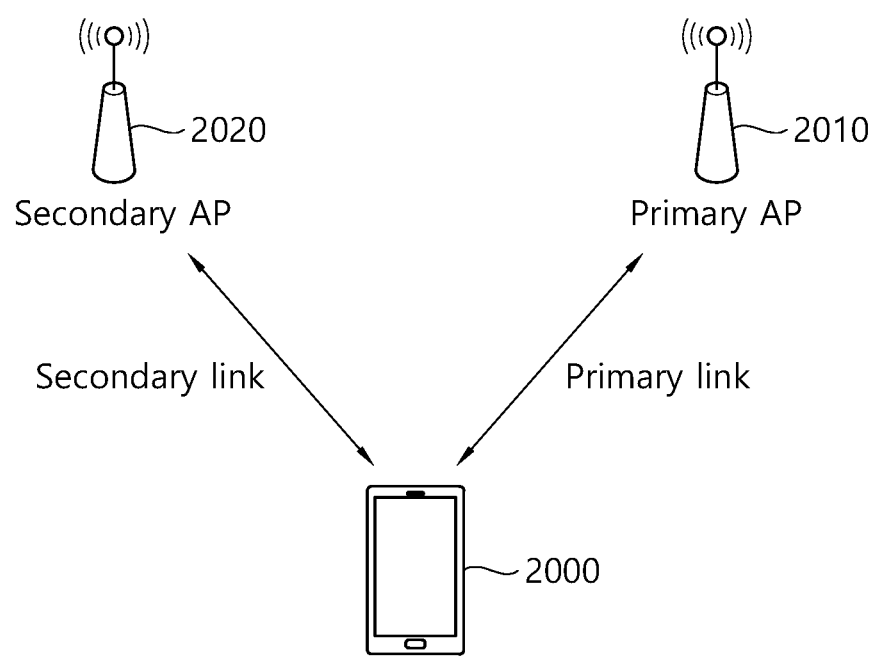
FIG. 20 is a conceptual diagram of a wireless terminal supporting dual connectivity according to an embodiment of the present specification.

FIG. 20 is a conceptual diagram of a wireless terminal supporting dual connectivity according to an embodiment of the present specification.

Referring to FIG. 20, a wireless terminal (i.e., STA 2000) according to the present embodiment may be connected to two APs 2010 and 2020. In the present specification, a wireless terminal (i.e., STA 2000) connected to the two APs may be understood as a terminal supporting dual connectivity.

For example, the dual connectivity technology may include 1 RF dual connectivity technology and 2 RF dual connectivity technology according to the number of radio frontend (RF) modules implemented in a wireless terminal.

For example, a terminal with one RF module can transmit/receive only in one broadband channel. In addition, a terminal having two RF modules can simultaneously transmit/receive in two broadband channels.

However, even in the case of two RF modules, the wireless terminal may include only one MAC layer. In this case, the wireless terminal may not support an operation in which a transmission operation is performed in one RF module and a reception operation is performed in another RF module at the same time.

When the 1 RF dual connectivity technology discussed in the present specification is applied, the following characteristics may be applied.

For example, even if two APs operate in the same channel band, in case different primary channels are allocated for the two Aps, a transmission operation may be selectively performed according to whether each primary channel is busy/idle. That is, even if the primary channel of a first AP is busy, the transmission operation may be performed based on the idle primary channel of a second AP.

For example, when two APs to which a wireless terminal is connected use different channels, the wireless terminal can switch to an AP having better performance depending on the situation. In particular, when a first operation channel (i.e., a primary 20 MHz channel) for a first AP is different from a second operation channel of a second AP, the transmission speed and transmission distance may be selected in order to have optimal performance according to the situation. For example, in an environment in which the strength of a radio signal is high, wireless communication with a first AP operating in a 5 GHz band (or a 60 GHz band) may be performed. Further, in an environment in which the signal strength is weak, the wireless communication may be switched to a second AP operating in a 2.4 GHz band.

As another example, when two APs use the same channel including a primary channel, the performance gain may not be large in an environment where the wireless terminal is fixed. However, if the wireless terminal moves slightly, the wireless communication can be performed by immediately switching to an AP having a better signal strength.

In addition, in the 1 RF dual connectivity technology, when two APs use different bands/different channels, there is an overhead for changing channels. However, in general, the overhead for channel changing is overwhelmingly less than the overhead for newly performing a connection with an AP.

When the 2 RF dual connectivity technology discussed in the present specification is applied, the following characteristics may be applied.

For example, even if two APs use different bands/different channels, the wireless terminal may use two RF modules. Accordingly, the wireless terminal can simultaneously check the state of each channel without changing channels.

For example, when two APs use the same channel, the wireless terminal may use two RF modules for a conventional broadband (e.g., 160 MHz in 5 GHz band or multi channels in 60 GHz band) transmission/reception, or use one of the two RF modules for scanning an AP in another band. However, when two APs use different bands/different channels and each RF module included in the wireless terminal is allocated to a corresponding AP, the wireless terminal may not perform a broadband transmission/reception.

The primary AP 2010 of FIG. 20 may be understood as an AP in which a major operation of a wireless terminal 2000 (or a STA) is performed. For example, a security/authentication process may be performed before a connection process between the wireless terminal 2000 and the primary AP 2010.

For example, the wireless terminal 2000 may continue to perform a transmission/reception operation with the primary AP 2010 (unless there is separate signaling). In the present specification, a radio link between the wireless terminal 2000 and the primary AP 2010 may be referred to as a primary link.

A secondary AP 2020 of FIG. 20 may be understood as an AP on which an additional operation of the wireless terminal 2000 is performed. For example, some (or all) of the connection processes between the wireless terminal 2000 and the secondary AP 2020 may be omitted.

In addition, additional signaling may be required for transmission/reception with the secondary AP 2020. In the present specification, the wireless link between the wireless terminal 2010 and the secondary AP 2020 may be referred to as a secondary link.

For example, the primary AP 2010 and the secondary AP 2020 of FIG. 20 may be physically co-located. Further, the present specification is not limited to whether a link exists between the primary AP 2010 and the secondary AP 2020.

Hereinafter, in the present specification, a method of transmitting a data frame between a wireless terminal and an AP may operate differently depending on the number of RF modules included in the wireless terminal, a channel distribution of a primary AP, and a channel distribution of a secondary AP.

In this specification, a method for a wireless terminal to discover an AP in a wireless LAN system includes a passive scanning method/scheme and an active scanning method/scheme.

For example, when the passive scanning is used, the AP may periodically transmit a beacon frame including information related to the dual connectivity. As another example, when the active scanning is used, the AP may configure and transmit a probe response frame including the information related to the dual connectivity.

In the present specification, the information related to the dual connectivity may include: information related to whether to support the dual connectivity; information related to a list of APs capable of a secondary AP function when operating as a primary AP; information related to a list of APs capable of a primary AP function when operating as a secondary AP; information related to the number of terminals (and/or traffic load of terminals) using the AP as a primary/secondary AP; and/or information related to whether to support a Linked Secure Association function.

Here, the information related to whether to support the dual connectivity may be related to whether a corresponding AP supports the dual connectivity function. In order for the AP to support the dual connectivity function, the AP may be required to have a function of filtering frames to be transmitted to the wireless terminal according to specific conditions while obtaining/acquiring information related to other APs nearby.

Here, the information related to the list of APs capable of a secondary AP function when operating as a primary AP is related to APs that can operate as a secondary AP based on the dual connectivity function among neighboring APs. The information related to the list of APs capable of a secondary AP function may be included in a beacon frame transmitted by an AP operating as a primary AP.

Specifically, APs included in the above-mentioned AP list may receive or transmit information related to authentication from the AP which has transmitted the beacon frame. Alternatively, APs included in the above-mentioned AP list may exchange frames by filtering frames according to specific conditions. Furthermore, APs included in the above-mentioned AP list may include information related to the level of the current traffic load, the number of terminals, and/or whether a Linked Secure Association function is supported.

In the present specification, the information related to a list of APs capable of a primary AP function when operating as a secondary AP is associated with APs that can operate as a primary AP based on the dual connectivity function among neighboring APs. The information related to a list of APs capable of a primary AP function may be included in a beacon frame transmitted by an AP operating as a secondary AP.

Specifically, APs included in the above-mentioned AP list may receive or transmit information related to authentication from the AP which has transmitted the beacon frame. Alternatively, APs included in the above-mentioned AP list may exchange frames by filtering frames according to specific conditions.

Here, the information related to the number of terminals using the AP as a primary/secondary AP, and/or information related to the traffic load of terminals using the AP as a primary/secondary AP may be related to the number of terminals using APs as a primary AP and a secondary AP and traffic load of each AP.

Here, the information related to the Linked Secure Association function may be related to whether to support a function that allows omitting/skipping a part or all of the connection process with the secondary AP after completing a connection establishment with a primary AP in order to speed up the connection with the two APs. When an AP informs whether or not to support the Linked Secure Association function, the wireless terminal (i.e., the STA) can complete the connection process with the AP(s) more quickly.

In the present specification, information related to dual connectivity transmitted by a wireless terminal (i.e., a STA) may include information related to a currently used primary/secondary AP, RF information, and/or information relate to a type of an AP which can transmit a response desired by the wireless terminal.

In the present specification, the information related to the currently used primary/secondary AP may be provided to the AP when a wireless terminal (i.e., a STA) is using (or planning to use) the dual connectivity function and when the wireless terminal is connected to either a primary AP or a secondary AP.

In the present specification, the RF information may be information for informing an AP how to use the RF of the UE when the UE has two RFs. For example, the RF information may be used to indicate that one of the two RFs is assigned to a primary AP and the other is assigned to a secondary AP, and/or that both RFs are used for broadband transmission/reception of the primary AP and two RFs are switched after separate signaling.

In the present specification, the information related to a type of an AP which can transmit a response desired by the wireless terminal may be information used to designate a type of the AP which can transmit a probe response frame in response to a probe request frame transmitted by the wireless terminal (i.e., the STA). If the wireless terminal (i.e., the STA) designates the primary AP in the AP type information, only an AP operating as the primary AP can transmit the response. If the wireless terminal does not designate the AP type in the AP type information, all APs may respond in response to the probe request frame transmitted by the wireless terminal (i.e., the STA).

In the present specification, the AP and the wireless terminal (i.e., the STA) of the wireless LAN system may basically perform the following operations.

According to the present embodiment, the AP may include information related to the dual connectivity in a beacon frame and transmit it periodically.

For example, a specific AP, which operates as the secondary AP, may desire that only a wireless terminal authenticated by the primary AP is allowed to connect the specific AP for enhanced security. In this case, the specific AP obtains information related to wireless terminal(s) authenticated by the primary AP without separate transmission of a beacon frame or a probe response frame according to a broadcast scheme. Thereafter, the specific AP may transmit a probe response frame to the wireless terminal(s) authenticated by the primary AP, only when a probe request frame is received from the wireless terminal(s).

In addition, the AP may include information related to the dual connectivity in the probe response frame in response to the probe request frame received from the STA and transmit it to the corresponding STA. For example, when a wireless terminal designates an AP type, only an AP operating in the designated AP type can transmit a probe response frame to the wireless terminal.

According to the present embodiment, when there is no AP currently connected or there is no information on neighboring APs, the wireless terminal (i.e., the STA) may transmit a probe request frame based on a broadcast scheme or wait to receive a beacon frame an AP.

In addition, when the wireless terminal (i.e., the STA) operates in connection with an AP with the dual connectivity function, if the wireless terminal has previously received information related to neighboring APs from the connected AP, the wireless terminal may selectively transmit a probe request frame based on a unicast scheme.

In addition, the wireless terminal (i.e., the STA) may select an AP after receiving information related to the dual connectivity from neighboring APs to start an authentication and/or connection process. In this case, the wireless terminal may select an AP operating as the primary AP and/or the secondary AP in advance, and finish the selection of the primary and/or the secondary AP when the connection process including the dual connectivity negotiation process with primary AP and/or the secondary AP is completed during the connection process. Alternatively, after performing the connection process with each of the two APs is, the wireless terminal may select the primary AP and/or the secondary AP through the dual connectivity negotiation process.

In addition, the wireless terminal (i.e., the STA) may determine an AP operating as the primary AP and/or the secondary AP based on the dual connectivity information received from APs.

In this specification, a description of the dual connectivity negotiation process will be described with reference to FIG. 21.

Figure 21:
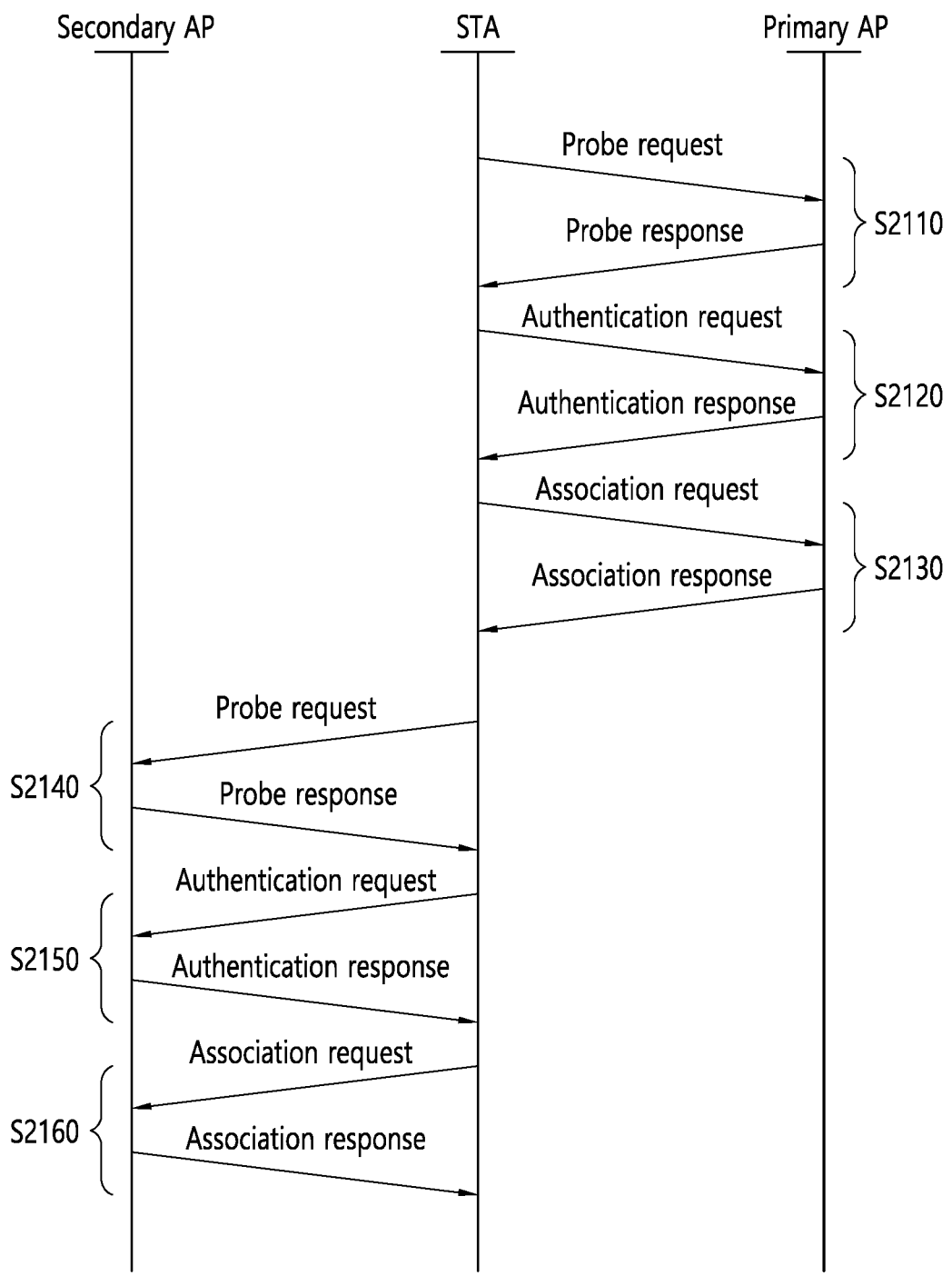
FIG. 21 is a view illustrating a process in which a wireless terminal supporting dual connectivity performs a Level 1 connection with a plurality of APs according to an embodiment of the present specification.

FIG. 21 is a view illustrating a process in which a wireless terminal supporting dual connectivity performs a Level 1 connection with a plurality of APs according to an embodiment of the present specification.

For example, when the wireless terminal (i.e., the STA) of FIG. 21 fails to determine which AP operates as a primary AP and another AP operates as a secondary AP, the wireless terminal (i.e., the STA) of FIG. 21 performs a connection with both APs.

Referring to FIG. 21, a wireless terminal (i.e., a STA) may perform a connection process with each of the primary AP and the secondary AP. For example, the wireless terminal (i.e., the STA) of FIG. 21 may perform all of the scanning process (S2110), the authentication process (S2120), and the association process (S2130) with the primary AP.

Subsequently, the wireless terminal (i.e., the STA) of FIG. 20 may perform all of the scanning process (S2140), the authentication process (S2150), and the association process (S2160 with the secondary AP.

When all steps S2110 to S2160 are performed, the wireless terminal (i.e., the STA) of FIG. 21 may re-determine a primary AP and/or a secondary AP through a dual connectivity negotiation process (not shown).

As another example, a primary AP and a secondary AP may be determined in steps S2130 and S2160 of FIG. 21. In this case, when the connection process with two APs are completed, the primary AP and the secondary AP may be determined.

Figure 22:
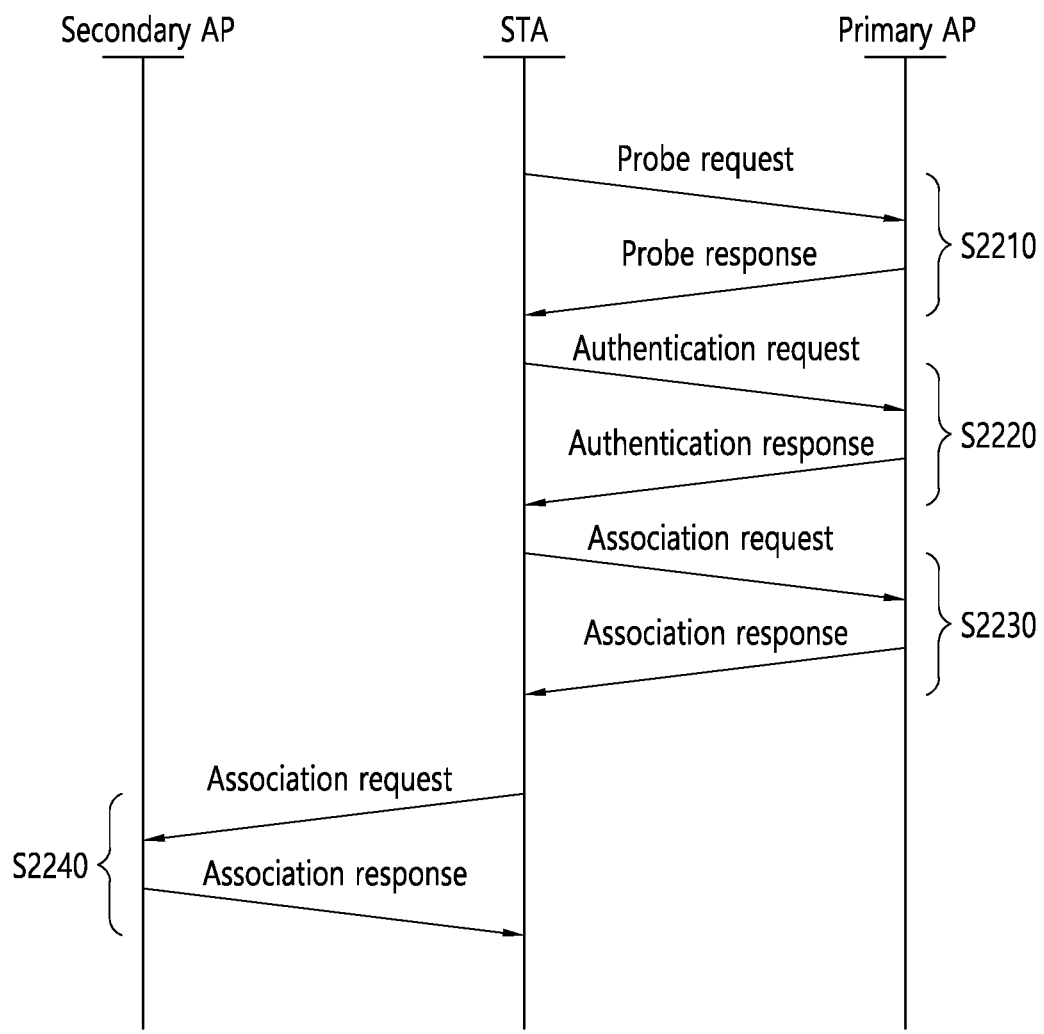
FIG. 22 is a view illustrating a process in which a wireless terminal supporting dual connectivity performs a Level 2 connection with a plurality of APs according to another embodiment.

FIG. 22 is a view illustrating a process in which a wireless terminal supporting dual connectivity performs a Level 2 connection with a plurality of APs according to another embodiment.

Referring to FIG. 22, a wireless terminal (i.e., a STA) may perform the scanning process (S2210), the authentication process (S2220), and the association process (S2230) with a primary AP.

A secondary AP of FIG. 22 may receive security related information for a corresponding wireless terminal (i.e., a STA) from the primary AP in advance. Accordingly, the wireless terminal (i.e., the STA) may perform only the association process (S2240) with the secondary AP.

In addition, when the secondary AP receives an association request frame from a wireless terminal (i.e., a STA), the secondary AP queries the primary AP for authentication information of the wireless terminal (i.e., the STA) and then responds an association response to the corresponding wireless terminal (i.e., the STA).

According to the present embodiment, an AP to which a wireless terminal (i.e., a STA) is first connected may operate as a primary AP, and an AP connected to a wireless terminal (i.e., a STA) after that may operate as a secondary AP.

In addition, after the connection process with both APs is completed, the primary AP and the secondary AP may be determined again through a dual connectivity negotiation process (not shown).

Alternatively, a dual connectivity negotiation process (not shown) may be omitted and the initially determined primary AP and secondary AP may be continuously used.

In an embodiment different from FIGS. 21 and 22, the wireless terminal (i.e., the STA) may perform a Level 3 connection process only with the primary AP, and the wireless terminal (i.e., the STA) may be automatically connected to the secondary AP without a separate connection process.

In this case, the wireless terminal (i.e., the STA) may determine the secondary AP during the connection process with the primary AP. In this case, the primary AP may transmit information related to the corresponding wireless terminal (i.e., the STA) to the selected secondary AP.

When the level 3 connection process is performed, the primary AP and/or the secondary AP may be re-determined through a dual connectivity negotiation process (not shown) similar to the level 2 connection.

Figure 23:
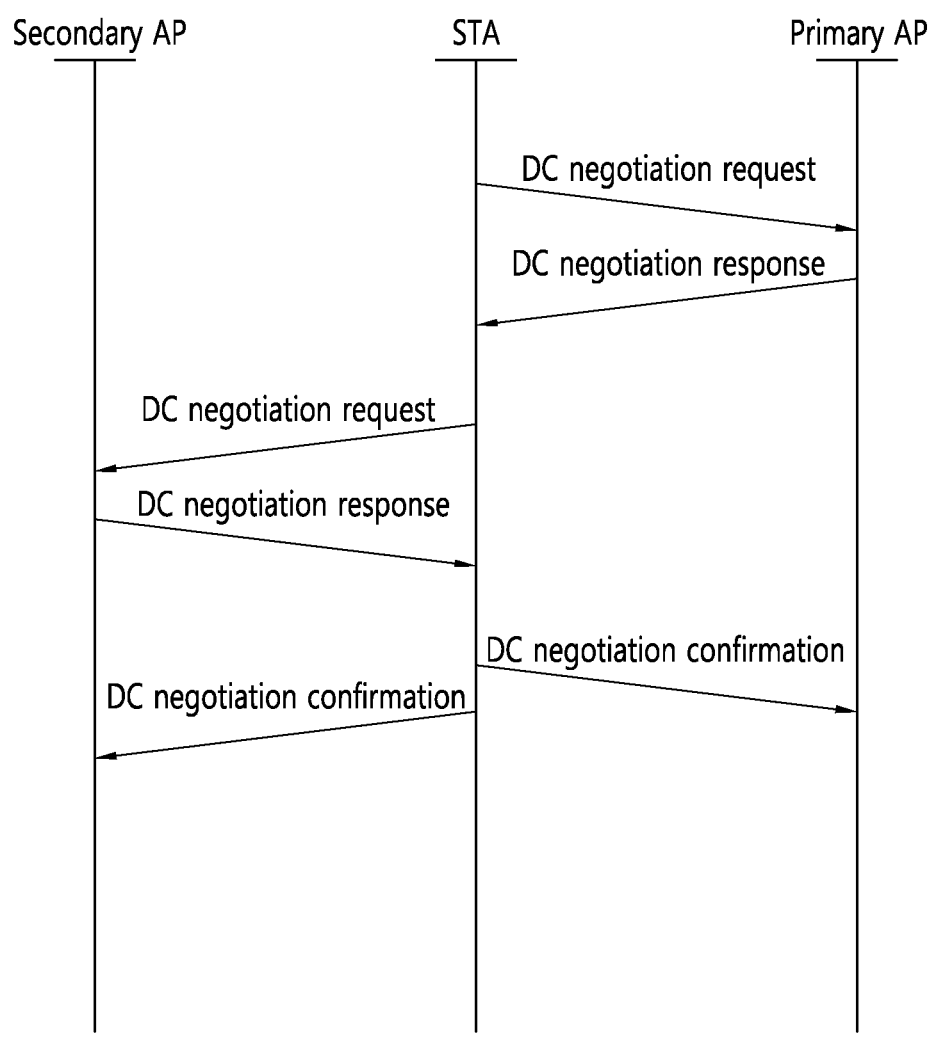
FIG. 23 is a diagram illustrating a dual connectivity negotiation process according to an embodiment of the present specification.

Alternatively, a dual connectivity negotiation process (not shown) may be omitted and the FIG. 23 is a diagram illustrating a dual connectivity negotiation process according to an embodiment of the present specification.

Referring to FIG. 23, a wireless terminal (i.e., a STA) of FIG. 23 may transmit a dual connectivity negotiation request frame (hereinafter, referred to as "DC negotiation request frame") to each of a primary AP and a secondary AP.

For example, the DC negotiation request frame may be a frame requesting information necessary to determine the primary AP and/or the secondary AP.

Upon receiving the DC negotiation request frame, the AP may transmit the DC negotiation response frame to the corresponding wireless terminal (i.e., the STA). For example, the DC negotiation response frame may include all information necessary to determine the primary AP and/or the secondary AP.

When all DC negotiation response frames are received from the primary AP and the secondary AP of FIG. 23, the wireless terminal (i.e., the STA) of FIG. 23 may determine AP(s) operating as the primary AP and/or the secondary AP.

Subsequently, information determined for the primary AP and/or the secondary AP may be included in a DC Negotiation Confirm frame and transmitted to the primary AP and the secondary AP, respectively. Specifically, the DC negotiation request frame may include information related to dual connectivity of the wireless terminal (i.e., the STA).

For example, information related to the dual connectivity of the wireless terminal (i.e., the STA) included in the DC negotiation request frame may be the same as information defined for the scanning process depicted in FIG. 22. However, the information related to a type of an AP which can transmit a response desired by the wireless terminal may be defined for the purpose of asking the AP for a preference to operate.

For example, if a corresponding information value is set and transmitted to an AP1 as a primary AP, the AP1 may respond with a specific value selected among preference values 1 to 10 to inform the preference of operating as the primary AP.

The DC Negotiation Response frame may include information related to dual connectivity of the AP.

For example, the information related to the dual connectivity of the AP included in the DC negotiation response frame may be the same as information defined for the scanning process depicted in FIG. 22, or information provided during the scanning process before the connection process has been updated.

Furthermore, preference information (e.g., preference values) for indicating a preference for the AP to operate as the primary/secondary AP may be added to the DC negotiation response frame.

For example, as the AP that transmits the DC negotiation response frame desires to operate as the primary AP, the preference value may be set to close to 10. In addition, as the AP that transmits the DC negotiation response frame desires to operate as the secondary AP, the preference value may be set to close to 1. Upon receiving the DC negotiation response frame including the preference information, the wireless terminal (i.e., the STA) may determine the primary AP and/or the secondary AP based on the received preference information.

At least one step in the dual connectivity negotiation process of FIG. 23 may be omitted, and may be performed together with the association process of FIGS. 21 and 22.

In the present specification, the criteria for dividing or determining the primary AP and/or the secondary AP may be as shown in Table 5 below. At least one example in Table 5 below may be information determined by the STA and notified to the AP. Also, at least one example in Table 5 below may be information that is determined by the AP and must be followed by the STA.

TABLE 5

| | Criteria | Primary AP | Secondary AP |
|---|---|---|---|
| Case 1 | Direction | DL and UL | DL only |
| Case 2 | Access Category | VO(Voice), VI(Video), BE(Best effort), BK(Background) | VO, VI |
| Case 3 | Channel access method | EDCA, HCCA | HCCA |
| Case 4 | Frame length | Short length or Long length | Long length frame only |
| Case 5 | Transmission rate | Low rate or high rate | High rate frame only |
| Case 6 | QoS | Low or High quality traffic | High Quality traffic |
| Case 7 | Frame type | Data or Management frame | Data frame only |
| Case 8 | Frequency band | 2.4 GHz | 5 GHz |
| etc | No Criteria | | |

Referring to Table 5, the primary AP and the secondary AP may be divided/determined based on a transmission direction of a frame. For example, the primary AP may allow both downlink transmission and uplink transmission, and the secondary AP may only allow either downlink transmission or uplink transmission.

If the secondary AP only performs downlink transmission on a specific channel, overhead associated with channel contention for a wireless medium may be reduced. Also, considering that most types of traffic are downlinks, the overall performance of the WLAN system can be improved.

Conversely, when the number of wireless terminals in the wireless LAN system is too large, a method of allocating wireless terminals that performs channel contention for uplink transmission to the secondary AP may be considered for guaranteeing a certain performance in the primary AP.

Referring to Table 5, the primary AP and the secondary AP may be divided/determined based on an access category (AC) of a frame. For example, the primary AP may allow all of the transmission operations for VO, VI, BE, and BK type frames, and the secondary AP may allow only the transmission operations for VO and VI type frames.

When the secondary AP transmits only frames belonging to a specific AC associated with a high priority, overhead associated with channel contention in the WLAN system may be reduced. In addition, since a high priority traffic is transferred to the secondary AP, BE and BK type traffics can be protected in the primary AP. In this case, the overall performance of the wireless LAN system can be improved.

Referring to Table 5, the primary AP and the secondary AP may be divided/determined based on a channel access method.

For example, the primary AP may transmit a frame using the EDCA or HCCA method, and the secondary AP may transmit the frame using the HCCA method only. If the AP transmits only by the method allocated in the secondary link, overhead related to the channel contention is hardly generated and thus QoS of a specific traffic can be satisfied.

Referring to Table 5, the primary AP and the secondary AP may be divided/determined based on a frame length.

For example, the primary AP may transmit frames without limitation on the length, and the secondary AP may transmit only frames having a specific length or more. For example, if a frame having a short length is frequently transmitted, overhead of a wireless LAN system may increase and performance may decrease due to contention collision. Accordingly, when the secondary AP only transmits frames having a specific length or more, overhead of the wireless LAN system may be reduced and performance may be improved.

Referring to Table 5, the primary AP and the secondary AP may be divided/determined based on a transmission rate.

For example, the primary AP can transmit frames without restriction of a transmission rate, and the secondary AP can transmit only frames having a specific transmission rate or higher. For example, if frames having a low transmission rate are frequently transmitted, overhead of a wireless LAN system may increase. Accordingly, when the secondary AP only transmits frames having a specific transmission rate or higher, overhead of the wireless LAN system may be reduced and performance may be improved.

Referring to Table 5, the primary AP and the secondary AP may be divided/determined based on QoS.

For example, the primary AP may transmit traffic without QoS restrictions, and the secondary AP may transmit only traffic having a specific QoS level or higher. For example, when the secondary AP transmits only traffic having a specific QoS level or higher, channel contention overhead in a wireless LAN system may be reduced and overall performance may be improved. In addition, since high priority traffic can be transferred to the secondary AP, other traffic in the primary AP can be protected to some extent.

Referring to Table 5, the primary AP and the secondary AP may be divided/determined based on the type of a frame.

For example, the primary AP can transmit frames without restrictions on the type of the frame, but the secondary AP can transmit only data frames. For example, if a management frame is frequently transmitted, overhead of a wireless LAN system may increase. Accordingly, when the secondary AP transmits only data frames, overhead of the WLAN system may be reduced and overall performance may be improved.

Referring to Table 5, the primary AP and the secondary AP may be divided/determined based on a BSS operating frequency band.

For example, the primary AP can guarantee a stable transmission distance in the 2.4 GHz band, and the secondary AP can provide better throughput through wideband ultra-high-speed transmission in the 5 GHz band.

The criterion for dividing/determining the primary AP and the secondary AP in Table 5 is explained for exemplary purposes. Accordingly, the criterion in Table 5 can be changed variously.

Hereinafter, an example of method of transmitting, by a primary AP and a secondary AP, a response signal to uplink (UL) data which has been transmitted from a STA may be described.

The STA may be connected to the first AP and the second AP at the same time. The STA may obtain/acquire control information related to whether the second AP can obtain/acquire a transmission/reception signal of the first AP. In addition, the STA may acquire/obtain control information related to whether the first AP can obtain/acquire a transmission/reception signal of the second AP.

The operation of obtaining/acquiring the above-described transmission/reception signal may include an operation of receiving and interpreting (or decoding) the signal. For example, that the second AP can obtain/acquire the transmission/reception signal of the first AP may mean that the second AP can receive and interpret (or decode) the signal transmitted (and/or received) by the first AP.

For example, the second AP may receive and interpret an uplink (UL) signal transmitted from the STA to the first AP. The second AP may decode the UL signal transmitted from the STA to the first AP. Accordingly, the second AP can check/confirm the transmitting STA and the destination STA of the transmission/reception signal of the first AP. That is, the second AP may confirm that the STA has transmitted the UL signal to the first AP. In addition, the second AP may confirm that the first AP has transmitted a downlink (DL) signal (e.g., a Block ACK (BA) signal) to the STA.

As another example, the second AP may obtain/acquire UL data included in the UL signal. The second AP may transmit the UL data to the first AP or may transmit the UL data to another STA.

When the first AP and the second AP can obtain/acquire transmission/reception signals from each other, the first AP and the second AP may be expressed as "hearable" to each other.

According to an embodiment, the STA may obtain/acquire control information related to whether the second AP can obtain/acquire the transmission/reception signal of the first AP based on an ADDBA process. Specifically, the STA may transmit an ADDBA request signal to the second AP. Thereafter, the STA may receive an ADDBA response signal from the second AP. The ADDBA response signal may include control information related to whether the second AP can obtain/acquire the transmission/reception signal of the first AP.

According to an embodiment, the STA may perform the same ADDBA process to the first AP. Accordingly, the STA may obtain/acquire control information related to whether the first AP can obtain/acquire the transmission/reception signal of the second AP.

According to an embodiment, the STA may transmit the UL signal to the first AP. The UL signal may include UL data.

According to an embodiment, the STA may determine whether to transmit a block acknowledgment request (BAR) signal for the UL signal to the second AP based on the control information. The BAR signal may include a signal for requesting a block ACK (BA) signal from the second AP.

According to an embodiment, the STA may not receive the BA signal for the UL signal from the first AP during a preset/predetermined period. Thereafter, the STA may determine whether to transmit the BAR signal for the UL signal to the second AP based on the control information.

For example, the STA may not transmit the BAR signal based on the fact that the second AP can obtain/acquire the transmission/reception signal of the first AP. The STA may know that the second AP transmits the BA signal for the UL signal instead of the first AP. Accordingly, the STA may receive the BA signal for the UL signal from the second AP after the preset period.

For another example, the STA may transmit a Block Acknowledgement Request (BAR) signal for the UL signal to the second AP based on that the second AP cannot obtain/acquire the transmission/reception signal of the first AP. The second AP may transmit a BA signal for the UL signal in response to the BAR signal. The STA may receive the BA signal from the second AP.

Hereinafter, specific operations of the STA, the first AP, and the second AP for describing the above-described embodiment may be described. In the following examples, the first AP may include the primary AP, and the second AP may include the secondary AP. For convenience of description, hereinafter, the first AP may be described as the primary AP. Further, the second AP may be described as the secondary AP.

In addition, the BA signal transmitted by the first AP may be referred to as a first response signal. The BA signal transmitted by the second AP may be referred to as a second response signal. The BAR signal transmitted by the STA to the second AP may be referred to as a signal for requesting the second response signal.

Figure 24:
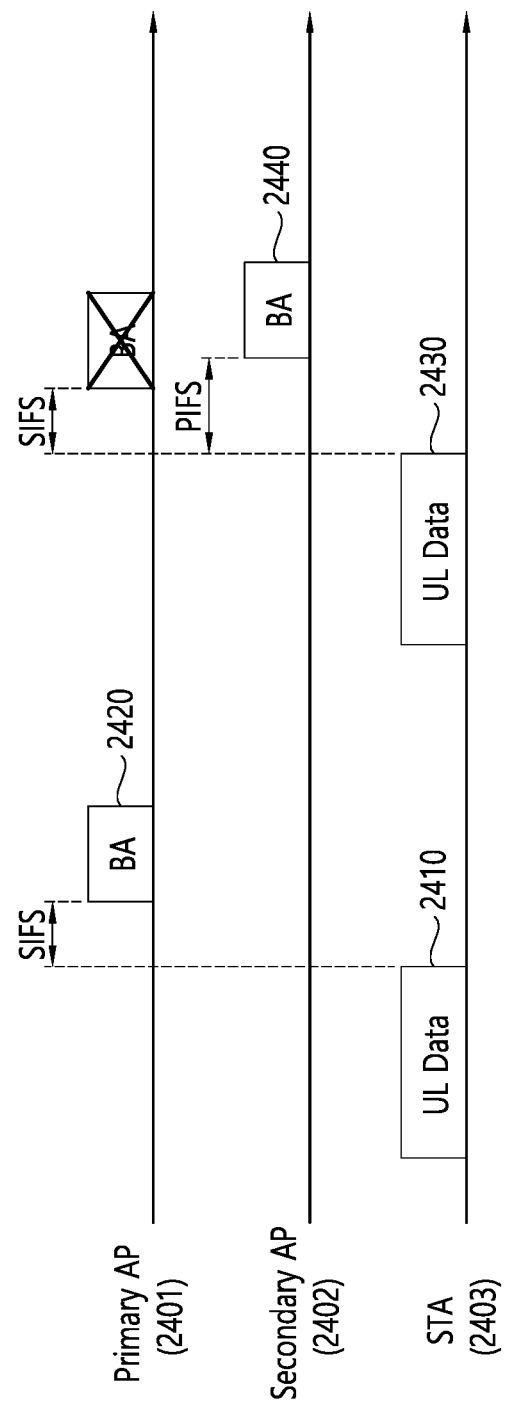
FIG. 24 is a diagram illustrating operations of a primary AP and a secondary AP for UL signal transmission by a STA.

FIG. 24 is a diagram illustrating operations of a primary AP and a secondary AP for UL signal transmission by a STA.

Referring to FIG. 24, the primary AP 2401 and the secondary AP 2402 may be "hearable" from each other. In other words, the primary AP 2401 may obtain/acquire a transmission/reception signal of the secondary AP 2402. In addition, the secondary AP 2402 may obtain/acquire a transmission/reception signal of the primary AP 2401.

The STA 2403 may transmit the first UL signal 2410 to the primary AP 2401. The first UL signal 2410 may include first UL data. The primary AP 2401 may receive the first UL signal 2410 transmitted by the STA 2403. The primary AP 2401 may transmit a Block ACK (or ACK) signal (or frame) 2420 for the first UL signal based on the first UL signal 2410. For example, the primary AP 2401 may receive the first UL signal 2410 and transmit, after a first period (e.g., SIFS), a Block ACK 2420 for the first UL signal 2410 to the STA 2403.

Unlike the above-described embodiment, the STA 2403 may transmit the second UL signal 2430 to the primary AP 2401. The second UL signal 2430 may include second UL data. The primary AP 2401 may not be able to receive the second UL signal 2430 transmitted by the STA 2403. Accordingly, the primary AP 2401 may not be able to transmit a Block ACK (or an ACK) signal (or frame) for the second UL signal 2430 even after the first period (e.g., SIFS).

Here, the secondary AP 2402 may receive the second UL signal 2430 transmitted by the STA 2403. The secondary AP 2402 may predict/expect that the primary AP 2401 will transmit a Block ACK (or ACK) signal for the second UL signal 2430. Accordingly, the secondary AP 2402 may check whether the primary AP 2401 transmits a Block ACK (or ACK) signal to the STA 2403 after the first period (e.g., SIFS). The secondary AP 2402 may transmit, based on that the primary AP 2401 does not transmit a Block ACK (or an ACK) signal to the STA 2403, a Block ACK (or an ACK) signal 2440 to the STA 2403 after a second interval (e.g., one slot time) has elapsed from an expected transmission time point of Block ACK of the primary AP. In other words, the secondary AP 2402 may transmit, based on that the primary AP 2401 does not transmit a Block ACK (or an ACK) signal to the STA 2403, the block ACK signal 2440 to the STA 2403 after a third period (e.g., a point coordination function inter-frame space (PIFS)) has been elapsed from the reception of the second UL signal 2430.

According to the embodiment of FIG. 24, when the STA 2403 transmits the UL signal to the primary AP 2401, the STA 2403 may receive a BA signal for the UL signal from the secondary AP 2402 even when the primary AP 2401 does not receive the UL signal. Therefore, according to the embodiment of FIG. 24, there is a technical effect that the STA 2403 does not need to transmit the UL signal again. In addition, there is a technical effect that the performance of the wireless LAN system can be improved.

Figure 25:
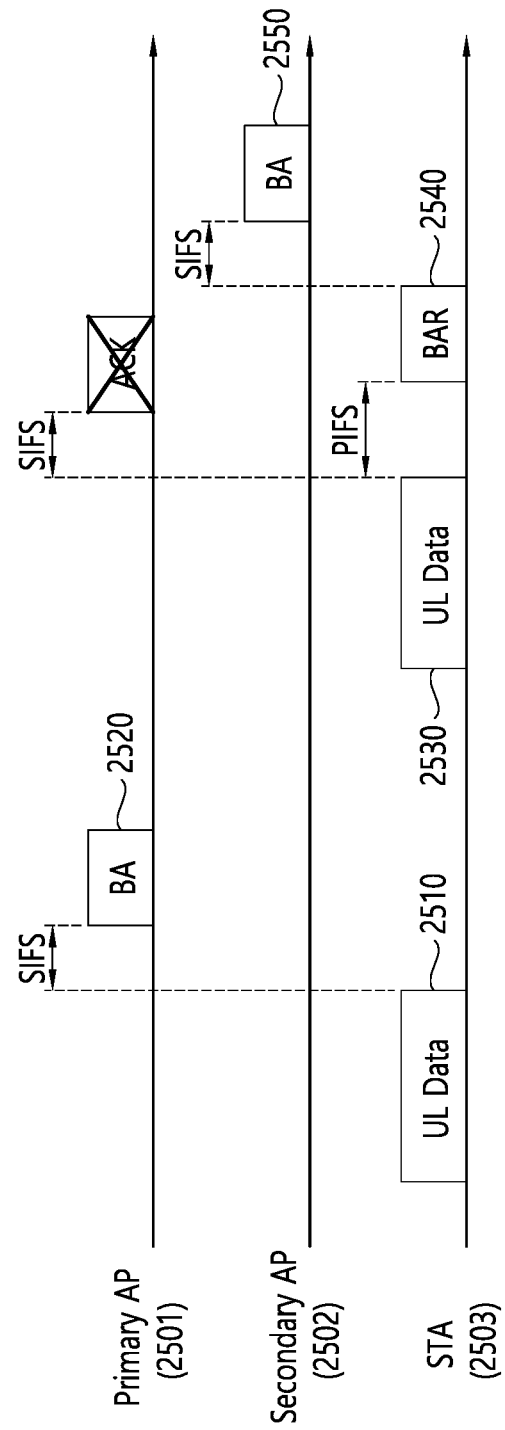
FIG. 25 is another diagram for explaining operations of a primary AP and a secondary AP for UL signal transmission by a STA.

FIG. 25 is another diagram for explaining operations of a primary AP and a secondary AP for UL signal transmission by a STA.

The primary AP 2501 and the secondary AP 2502 may not be "hearable" from each other. In other words, the primary AP 2501 may not be able to obtain/acquire a transmission/reception signal of the secondary AP 2502. In addition, the secondary AP 2502 may not be able to obtain/acquire a transmission/reception signal of the primary AP 2501.

The STA 2503 may transmit the first UL signal 2510 to the primary AP 2501. The first UL signal 2510 may include first UL data. The primary AP 2501 may receive the first UL signal 2510 transmitted by the STA 2503. The primary AP 2501 may transmit, based on the first UL signal 2510, a Block ACK (or an ACK) signal (or frame) 2520 for the first UL signal 2510. For example, the primary AP 2501 may receive the first UL signal 2510 and transmit a Block ACK signal 2520 to the STA 2503 after the first period (e.g., SIFS).

Unlike the above-described embodiment, the STA 2503 may transmit the second UL signal 2530 to the primary AP 2501. The second UL signal 2530 may include second UL data. The primary AP 2501 may not be able to receive the second UL signal 2530 transmitted by the STA 2503. Accordingly, the primary AP 2501 may not be able to transmit a Block ACK (or an ACK) signal (or frame) for the second UL signal 2530 even after the first period (e.g., SIFS).

Here, the secondary AP 2502 may receive the second UL signal 2530 transmitted by the STA 2503. The secondary AP 2502 may expect that the primary AP 2501 will transmit a Block ACK (or an ACK) signal for the second UL signal 2530.

However, unlike the secondary AP 2502 shown in FIG. 24, the secondary AP 2502 may not check/confirm whether the primary AP 2501 transmits a Block ACK (or an ACK) signal (or frame) to the STA 2503. For example, after a first period (e.g., SIFS) has been elapsed from the transmission of the second UL signal 2530 from the STA 2503, the secondary AP 2502 may not be able check/confirm whether the primary AP 2501 transmits a Block ACK (or an ACK) signal to the STA 2503. Accordingly, the STA 2503 may not be able to receive the Block ACK signal from both the primary AP 2501 and the secondary AP 2502.

In order to solve the above-described problem, after not receiving the Block ACK signal from the primary AP 2501 during a preset period (e.g., PIFS or SIFS), the STA 2503 may transmit a Block ACK Request (BAR) signal 2540 to the secondary AP 2502. The STA 2503 may request the BA signal 2550 from the secondary AP 2502 through the BAR signal 2540. The secondary AP 2502 may receive the BAR signal 2540 from the STA 2503. The secondary AP 2502 may transmit the BA 2550 for the second UL signal 2530 to the STA 2503.

FIGS. 24 and 25 may operate when the STA knows in advance whether the primary AP and the secondary AP are hearable. That is, the STA may determine whether to transmit the BAR to the secondary AP based on whether the primary AP and the secondary AP are hearable. In other words, the STA may determine one of the Block ACK transmission methods described in FIGS. 24 and 25 based on whether the primary AP and the secondary AP are hearable.

According to an embodiment, the STA may determine whether to transmit the BAR to the secondary AP based on whether the primary AP and the secondary AP can obtain/acquire each other's transmission/reception signals. According to an embodiment, the STA may determine whether to transmit the BAR to the secondary AP based on whether the secondary AP can obtain/acquire the transmission/reception signal of the primary AP.

Hereinafter, an operation in which the STA obtains information related to whether the primary AP and the secondary AP are hearable may be described.

Figure 26:
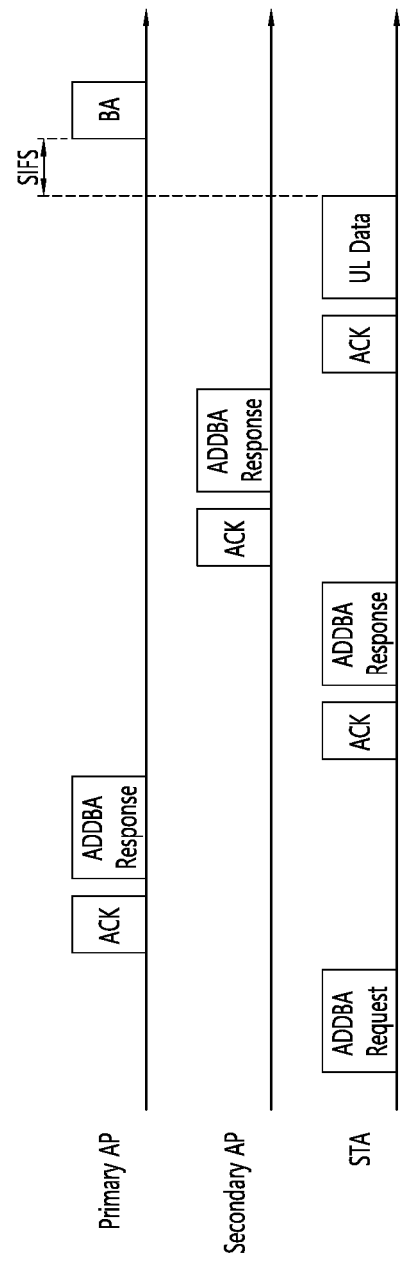
FIG. 26 is a diagram for illustrating a method for determining a block ACK transmission method.

FIG. 26 is a diagram for illustrating a method for determining a block ACK transmission method.

Referring to FIG. 26, an ADD Block ACK (ADDBA) procedure (or process) according to the 802.11 standard may be applied for determining a Block ACK (or a Block ACK signal) transmission method. The ADDBA procedure may be a procedure for initializing (or establishing) a Block ACK transmission procedure. The ADDBA procedure may consist of an exchange procedure of an ADDBA request frame and an ADDBA response frame.

The STA may transmit an ADDBA Request frame to each AP (i.e., the primary AP and the secondary AP). The STA may request a Block ACK transmission method. Each AP receiving the ADDBA Request frame may determine parameters for Block ACK transmission. APs may transmit an ADDBA Response frame to the STA. The ADDBA Response frame may include information related to parameters for Block ACK transmission.

For example, information related to parameters for Block ACK transmission may include information related to whether another AP to which the STA is associated is hearable. That is, the information related to parameters for Block ACK transmission may include information on whether other APs to which the STA is associated are able to obtain/acquire a signal to be transmitted/received to each other.

For example, the primary AP may transmit information related to whether the secondary AP is hearable to the STA. The secondary AP may transmit information related to whether the primary AP is hearable to the STA. In other words, the primary AP may transmit information related to whether the primary AP is able to obtain a transmission/reception signal of the secondary AP to the STA. The secondary AP may transmit information related to whether to the secondary AP is able to obtain a transmission/reception signal of the primary AP to the STA.

For another example, information related to parameters for Block ACK transmission may include information related to a Block ACK transmission method. That is, the information related to parameters for block ACK transmission may include information related to whether the STA transmits the BAR.

According to the embodiment of FIG. 25, the secondary AP may need to check whether the primary AP transmits a Block ACK to the STA during a first period (e.g., SIFS). Thereafter, the secondary AP may transmit a Block ACK to the STA after the second period (e.g., one slot time or PIFS). Accordingly, since the secondary AP needs to check whether the primary AP transmits the Block ACK during the first period, the workload or burden of the secondary AP may increase. Accordingly, in order to reduce the burden of the secondary AP, the secondary AP may operate according to the embodiment shown in FIG. 26.

According to an embodiment, the secondary AP may transmit the BA to the STA only after receiving the BAR (or the BAR signal) from the STA. In this case, the secondary AP does not need to check whether the primary AP transmits the BA during the preset period. In this case, there is an effect of reducing the load of the secondary AP.

Accordingly, according to an embodiment, the secondary AP may transmit the BA only when the BAR is received from the STA, even when the secondary AP is able to obtain the transmission/reception signal of the primary AP.

According to an embodiment, the secondary AP may transmit information related to whether the operation depicted in FIG. 25 is supported by the secondary AP to the STA. That is, when the primary AP fails to transmit a response signal to the STA, the secondary AP may transmit information related to that the response signal can be transmitted instead of the primary AP to the STA.

Information related to parameters for the above-described Block ACK transmission may be included in not only the ADDBA response frame, but also other management frames. For example, the information related to parameters for Block ACK transmission may be included in an Association Response frame, a Probe Response frame, or a DC negotiation response frame.

Figure 27:
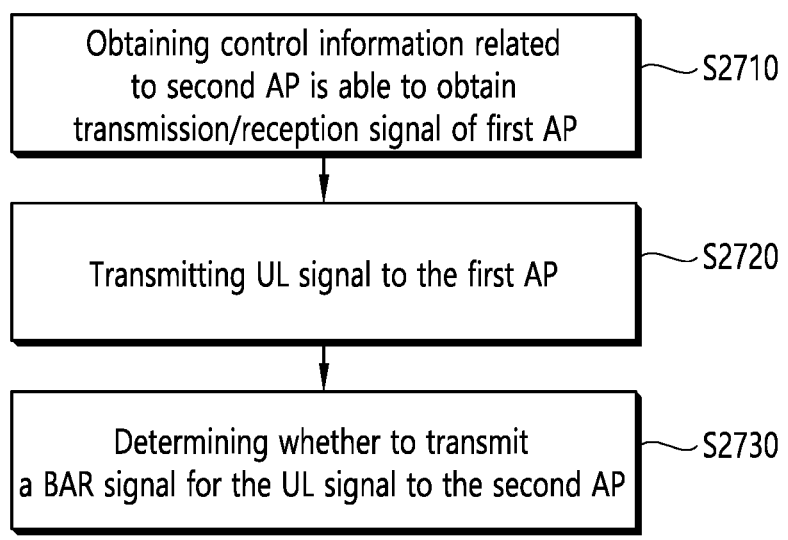
FIG. 27 is a flowchart for explaining the operation of a STA.

FIG. 27 is a flowchart for explaining the operation of the STA.

Referring to FIG. 27, in S2710, the STA may obtain/acquire control information related to whether the second AP can obtain/acquire the transmit/receive signal of the first AP. For example, that the second AP can obtain/acquire the transmission/reception signal of the first AP may mean that the second AP can receive the signal transmitted/received by the first AP and interpret (or decode) the signal. Thereafter, the second AP may check the transmitting STA and the destination STA of the signal transmitted and received by the first AP. For example, the second AP may confirm that the first AP has transmitted a signal to the STA.

According to an embodiment, the STA may obtain/acquire control information related to whether the second AP can obtain/acquire the transmit/receive signal of the first AP based on the ADDBA procedure (or process). Specifically, the STA may transmit an ADDBA request signal to the second AP. Thereafter, the STA may receive an ADDBA response signal from the second AP. The ADDBA response signal may include control information related to whether the second AP can obtain/acquire the transmission/reception signal of the first AP.

According to an embodiment, the STA may perform the same ADDBA procedure to the first AP. The STA may obtain/acquire control information related to whether the first AP can obtain/acquire the transmission/reception signal of the second AP.

In S2720, the STA may transmit a UL signal to the first AP. The UL signal may include UL data. Thereafter, the STA may know that the BA signal will be received from the first AP.

In S2730, the STA may determine whether to transmit a block acknowledgment request (BAR) signal for the UL signal to the second AP based on the control information.

According to an embodiment, the STA may not be able to receive the BA signal for the UL signal from the first AP during a preset period (e.g., SIFS or PIFS). The STA may determine whether to transmit the BAR signal for the UL signal to the second AP based on the control information.

For example, the STA may not transmit the BAR signal based on that the second AP can obtain/acquire the transmission/reception signal of the first AP. The STA may know that the second AP transmits the BA signal for the UL signal instead of the first AP. Accordingly, the STA may receive the BA signal for the UL signal from the second AP after a preset period.

For another example, the STA may transmit a Block Acknowledgement Request (BAR) signal for the UL signal to the second AP based on that the second AP cannot obtain/acquire the transmission/reception signal of the first AP. The second AP may transmit a BA signal for the UL signal in response to the BAR signal. That is, the STA may receive a BA signal from the second AP based on the BAR signal.

According to an embodiment, the STA may determine whether to transmit the BAR signal regardless of whether the second AP can obtain/acquire the transmission/reception signal of the first AP. For example, the STA may determine in advance whether to transmit the BAR signal with the first AP and the second AP. For example, the STA may determine in advance whether to transmit the BAR signal based on the ADDBA process.

For example, the ADDBA response signal may further include various information elements. For example, the ADDBA response signal may include information related to a Block ACK (BA) transmission method. The information related to the Block ACK transmission method may include information related to a method for the second AP to transmit the Block ACK when the STA does not receive a BA signal for the UL signal which has been transmitted by the STA itself.

Specifically, the STA may receive a BA signal for the UL signal which has been transmitted by the STA itself. As a first method of the Block ACK transmission method, the STA may wait for a preset period and receive a BA signal for the UL signal from the second AP. In addition, as a second method of the Block ACK transmission method, the STA may transmit a BA Request (BAR) signal to the second AP after not receiving the BA signal for the UL signal from the first AP during a preset period. The STA may receive the BA signal from the second AP based on the BAR signal. The preset period may include a short inter-frame space (SIFS) or a point coordination function inter-frame space (PIFS).

Figure 28:
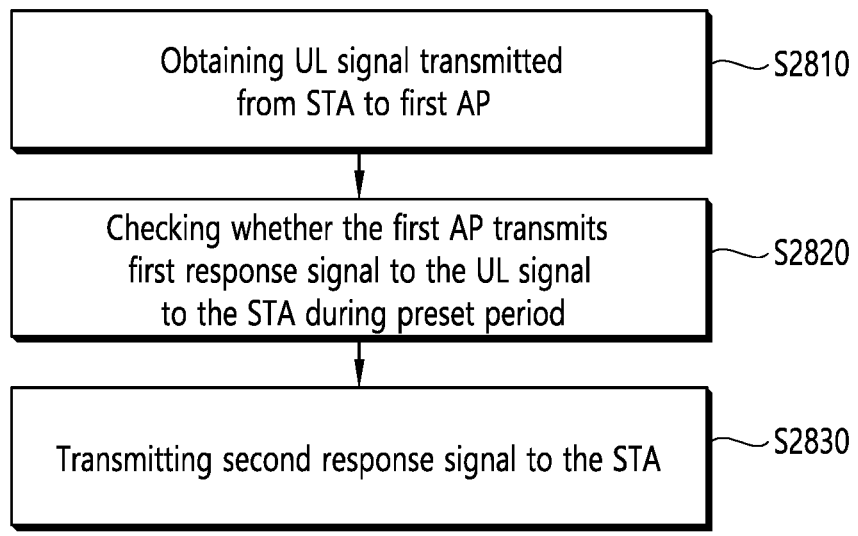
FIG. 28 is a flowchart illustrating an operation of a second AP.

FIG. 28 is a flowchart illustrating an operation of a second AP.

Referring to FIG. 28, in S2810, the second AP may obtain/acquire a UL signal transmitted from the STA to the first AP. The second AP may obtain/acquire a transmission/reception signal of the first AP. Accordingly, the second AP may obtain the UL signal transmitted from the STA to the first AP. Also, the second AP may obtain/acquire UL data of the UL signal.

In S2820, the second AP may check whether the first AP transmits the first response signal to the UL signal to the STA during a preset period. The preset period may include either SIFS or PIFS.

In S2830, the second AP may transmit the second response signal to the STA based on whether the first AP transmits the first response signal to the STA during a preset period.

According to an embodiment, the second AP may transmit the second response signal to the STA based on that the first AP does not transmit the first response signal to the STA during a preset period.

According to an embodiment, after the first AP does not transmit the first response signal to the STA during a preset period, the second AP may receive a signal for requesting a second response from the STA. The second AP may transmit a second response signal for the UL signal to the STA based on the signal for requesting the second response.

According to an embodiment, the first response signal and the second response signal may include a BA signal. In addition, a signal for requesting a second response may include a BAR signal.

The technical features of the present specification described above can be applied to various devices and methods. For example, the technical features of the present specification described above may be performed/supported through the apparatus of FIGS. 1 and/or 19. For example, the technical features of the present specification described above may be applied only to a part of FIGS. 1 and/or 19. For example, the technical features of the present specification described above may be implemented based on the processing chips 114 and 124 of FIG. 1, or implemented based on the processors 111 and 121 and the memories 112 and 122 of FIG. 1, or implemented based on the processor 610 and the memory 620 of FIG. 19. For example, an apparatus of the present specification includes a memory and a processor operatively coupled to the memory.

Further, the processor may obtain/acquire control information related to whether a second AP can obtain/acquire a transmission/reception signal of the first AP, generates a UL signal to the first AP, and determine, based on the control information, whether to transmit a block acknowledgment request (BAR) signal for the UL signal to the second AP.

Technical features of the present specification may be implemented based on a computer readable medium (CRM). For example, the CRM proposed by the present specification includes: obtaining control information related to whether a second access point (AP) is able to obtain a transmission/reception signal of a first AP; transmitting an uplink (UL) signal to the first AP; and determining whether to transmit a Block Acknowledgement Request (BAR) signal for the UL signal to the second AP based on the control information. Instructions stored in the CRM of the present specification may be executed by at least one processor. At least one processor related to the CRM of the present specification may be the processors 111 and 121 of FIG. 1 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (LAN) system, the method comprising:
    transmitting, by a station (STA), an ADD Block ACK (ADDBA) request signal to a second access point (AP);
    in response to the ADDBA request signal, receiving, by the STA, an ADDBA response signal from the second AP, wherein the ADDBA response signal includes control information related to whether the second AP is able to obtain a transmission/reception signal of a first AP;
    transmitting, by the STA, a physical protocol data unit (PPDU) to the first AP,
    wherein the PPDU includes a legacy signal (L-SIG) field, a repeated legacy signal (RL-SIG) field being contiguous to the L-SIG field, a control signal field being contiguous to the RL-SIG field,
    wherein the L-SIG field is transmitted based on 48 coded bits carrying a length field which is set to a value satisfying a condition that a remainder is zero when the length field is divided by three,
    wherein the L-SIG field carries four extra tones on subcarrier indices of $\{-28, -27, +27, +28\}$, and values of the four extra tones are set as $\{-1, -1, -1, +1\}$,
    wherein the RL-SIG field is a repeat of the L-SIG field, and
    wherein the control signal field includes first information related to a Basic Service Set (BSS) color, second information related to uplink and downlink direction, and third information related to a transmission opportunity (TXOP); and
    determining, by the STA, whether to transmit a Block Acknowledgement Request (BAR) signal for the UL signal to the second AP based on the control information.

2. The method of claim 1, further comprising transmitting, by the STA, the BAR signal to the second AP after not receiving a block acknowledgment (BA) signal for the UL signal from the first AP during a preset period.

3. The method of claim 2, wherein the preset duration includes a short inter-frame space (SIFS) or a point coordination function inter-frame space (PIFS).

4. The method of claim 1, further comprising receiving, by the STA, a BA signal for the UL signal from the second AP based on the BAR.

5. A station (STA) in a wireless local area network (LAN) system, the STA comprising:
    a transceiver configured to receive a wireless signal; and
    a processor configured to control the transceiver,
    wherein the processor is further configured to:
        transmit an ADD Block ACK (ADDBA) request signal to a second access point (AP);
        in response to the ADDBA request signal, receive an ADDBA response signal from the second AP, wherein the ADDBA response signal includes control information related to whether the second AP is able to obtain a transmission/reception signal of a first AP;
        transmit a physical protocol data unit (PPDU) to the first AP,
        wherein the PPDU includes a legacy signal (L-SIG) field, a repeated legacy signal (RL-SIG) field being contiguous to the L-SIG field, a control signal field being contiguous to the RL-SIG field, wherein the L-SIG field is transmitted based on 48 coded bits carrying a length field which is set to a value satisfying a condition that a remainder is zero when the length field is divided by three, wherein the L-SIG field carries four extra tones on subcarrier indices of {−28, −27, +27, +28}, and values of the four extra tones are set as {−1, −1, −1, +1}, wherein the RL-SIG field is a repeat of the L-SIG field, and wherein the control signal field includes first information related to a Basic Service Set (BSS) color, second information related to uplink and downlink direction, and third information related to a transmission opportunity (TXOP); and determine whether to transmit a Block Acknowledgement Request (BAR) signal for the UL signal to the second AP based on the control information.

6. The STA of claim 5, wherein the processor is further configured to transmit the BAR signal to the second AP after not receiving a block acknowledgment (BA) signal for the UL signal from the first AP during a preset period.

7. The STA of claim 6, wherein the preset duration includes a short inter-frame space (SIFS) or a point coordination function inter-frame space (PIFS).

8. The STA of claim 5, wherein the processor is further configured to receive a BA signal for the UL signal from the second AP based on the BAR signal.

\* \* \* \* \*